US010433277B2

United States Patent
Zhang et al.

(10) Patent No.: US 10,433,277 B2
(45) Date of Patent: Oct. 1, 2019

(54) ENHANCED MULTICAST BROADCAST MULTIMEDIA SERVICE IN ENHANCED COMPONENT CARRIERS OVER VARIABLE TRANSMISSION BANDWIDTH

(71) Applicant: QUALCOMM Incorporated, San Diego, CA (US)

(72) Inventors: Xiaoxia Zhang, San Diego, CA (US); Taesang Yoo, Riverside, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 15/270,965

(22) Filed: Sep. 20, 2016

(65) Prior Publication Data

US 2017/0127382 A1    May 4, 2017

Related U.S. Application Data

(60) Provisional application No. 62/249,740, filed on Nov. 2, 2015.

(51) Int. Cl.
*H04W 72/00* (2009.01)
*H04L 12/18* (2006.01)
(Continued)

(52) U.S. Cl.
CPC ....... *H04W 72/005* (2013.01); *H04L 12/1886* (2013.01); *H04W 72/082* (2013.01); *H04W 74/0808* (2013.01)

(58) Field of Classification Search
CPC ............ H04L 12/1886; H04W 72/005; H04W 72/082; H04W 74/0808
See application file for complete search history.

(56) References Cited

U.S. PATENT DOCUMENTS

2011/0055652 A1    3/2011  Park
2013/0100873 A1*   4/2013  Arnaud ................. H04L 12/189
                                              370/312
(Continued)

FOREIGN PATENT DOCUMENTS

WO    WO-2015160447 A1    10/2015

OTHER PUBLICATIONS

ISA/EP, International Search Report and Written Opinion of the International Searching Authority, Int'l Application No. PCT/US2016/052897, dated Jan. 5, 2017, European Patent Office, Rijswijk, NL, 12 pgs.

*Primary Examiner* — Jeffrey M Rutkowski
*Assistant Examiner* — Chae S Lee
(74) *Attorney, Agent, or Firm* — Holland & Hart LLP

(57) ABSTRACT

Methods, systems, and devices for wireless communication are described. A base station supporting multimedia broadcast multicast service (MBMS) and operating in a shared radio frequency spectrum band may map MBMS transport blocks (TBs) to each carrier in the system bandwidth. The device may perform a clear channel assessment (CCA) on one or more of the carriers, and transmit a portion of the MBMS TBs on carriers with successful CCAs. The portion of the MBMS TBs mapped to carriers with unsuccessful CCAs may be punctured. In various examples, a single TB may be mapped across the carriers, different TBs may mapped to each carrier, or redundancy versions (RVs) may be mapped to each carrier. A region at the frequency boundary of each carrier may be reserved for a guard region, and may not be used for MBMS transmissions when a carrier is associated with a failed CCA.

24 Claims, 16 Drawing Sheets

(51) Int. Cl.
*H04W 72/08* (2009.01)
*H04W 74/08* (2009.01)

(56) References Cited

U.S. PATENT DOCUMENTS

| | | | |
|---|---|---|---|
| 2014/0056279 A1* | 2/2014 | Chen | H04W 52/04 |
| | | | 370/330 |
| 2015/0055541 A1 | 2/2015 | Zhang et al. | |
| 2016/0183276 A1* | 6/2016 | Marinier | H04W 72/02 |
| | | | 370/329 |
| 2017/0181062 A1* | 6/2017 | Kim | H04W 48/10 |
| 2018/0007733 A1* | 1/2018 | Mochizuki | H04W 76/048 |
| 2018/0041989 A1* | 2/2018 | Shimezawa | H04W 72/04 |
| 2018/0241499 A1* | 8/2018 | Einhaus | H04L 1/00 |
| 2018/0255576 A1* | 9/2018 | Bhorkar | H04W 74/0808 |

* cited by examiner

ENHANCED MULTICAST BROADCAST MULTIMEDIA SERVICE IN ENHANCED COMPONENT CARRIERS OVER VARIABLE TRANSMISSION BANDWIDTH

CROSS REFERENCES

The present Application for Patent claims priority to U.S. Provisional Patent Application No. 62/249,740 by ZHANG, et al., entitled "EMBMS IN ECC OVER VARIABLE TRANSMISSION BANDWIDTH," filed Nov. 2, 2015, assigned to the assignee hereof.

BACKGROUND

The following relates generally to wireless communication, and more specifically to enhanced multicast broadcast multimedia service (eMBMS) in enhanced component carriers (eCC) over a variable transmission bandwidth.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Base stations may use Single Frequency Network (SFN) technology to distribute broadcast streams into defined areas during the same radio time slot. SFN transmission in a Multimedia Broadcast Multicast Service (MBMS) or eMBMS may achieve high broadcast capacity with multiple base stations synchronously transmitting the same contents. SFN transmissions from different cells may use the same set of communication resources (e.g., a same set of one or more radio frequency spectrum bands) and modulation and coding scheme (MCS) such that they appear to receiving UEs as coming from a single base station.

MBMS may also be used in a shared radio frequency spectrum band (e.g., an unlicensed radio frequency spectrum band). Multicast/Broadcast over a Single Frequency Network (MBSFN) on a shared radio frequency spectrum band may involve Listen-Before-Talk (LBT) procedures based on a clear channel assessment (CCA) or an enhanced CCA (eCCA). Thus, not all base stations may gain access to the communications medium, or the same portions thereof, during every time period. The condition where base stations gain access to different portions of a communications medium may interfere with synchronous transmission of the same content on the same resources from each base stations, which may result in a degraded signal at receiving UEs and/or degraded delivery of service to receiving UEs.

SUMMARY

A base station supporting MBMS and operating in shared radio frequency spectrum band may map one or more MBMS transport blocks (TBs) to a plurality of carriers of a system bandwidth. The base station may then perform a CCA on the plurality of carriers (e.g., a CCA on each of the plurality of carriers, a single CCA that otherwise assesses each of the plurality of carriers, etc.), and transmit a portion of the one or more MBMS TBs that are mapped on those carriers associated with a successful CCA result. The portion of the one or more MBMS TBs that are mapped to those carriers associated with a failed CCA may be punctured. In one example, a single TB is mapped to active carriers used for an MBSFN system (e.g., a TB that is divided across the plurality of carriers). In another example, different TBs (e.g., TBs that have non-overlapping MBMS content) are mapped to each carrier. In another example, different redundancy versions (RVs) (e.g., TBs that include at least a portion of MBMS content that is also included in another TB) are mapped to the different carriers. In some cases, a region at the boundary of each carrier may be reserved for a guard region, and may not be used for MBMS transmissions when the carrier is associated with a failed CCA.

In examples where a single TB is mapped to active carriers used for an MBSFN system, the single TB may benefit from maximum receiver diversity. This approach may facilitate processing timeline, for example, such that the single TB may be divided into multiple code blocks and mapped to available sub-carriers per symbol, and a receiving device may decode each codeblock sequentially. However, because contention procedures for a shared communications medium may not be successful for all active carriers, each of the active carriers may or may not be used for transmitting the single TB. To support coordinated MBSFN transmission, nodes of the MBSFN system may conform to a static subcarrier mapping (e.g., a static mapping based on all of the active carriers of the MBSFN system), and each node may puncture the carriers and/or subcarriers on which the node does not transmit (e.g., subcarriers associated with a failed CCA, guard region subcarriers adjacent to carriers associated with a failed CCA, etc.), which may result in suboptimal decoding performance.

In examples where different TBs are mapped to each carrier, each of the different TBs may have lesser frequency diversity. For example, each of the different TBs may only span a particular carrier. When nodes of an MBSFN system are not able to transmit on a carrier, or a portion thereof, the MBSFN gain may be reduced, hence the received signal to noise ratio (SNR) per TB may be subject to relatively large variation over time. Such conditions may result in diminished MBMS performance, as performance may be dictated by instances of low SNR.

In examples where different RVs of a TB are mapped to different carriers, information of the TB may be transmitted on active carriers of the MBSFN system (e.g., all active carriers). Thus, in some examples, the frequency diversity may include all of the active carriers. If fewer nodes perform MBSFN transmission on one of the carriers due to unsuccessful CCAs on that carrier, MBSFN performance may benefit from RV transmission on other carriers. The different RVs associated with the different carriers may not be subject to coded bit puncturing when a particular carrier or subcarrier is unavailable for transmission (e.g., due to an unsuccessful CCA), and therefore decoding performance may be improved compared to examples where different TBs are mapped to different carriers. In some examples, a receiver processing timeline when mapping a single TB across the carriers may be more efficient when mapping RVs to different carriers because the receiver may handle multiple codeblocks per carrier at the same time. However, broadcast services may not be associated with strict timeline requirements because broadcast services may not require hybrid automatic repeat request (HARQ) operations and/or acknowledgement/negative-acknowledgement (ACK/NACK) feedback.

Although examples may be described in the present disclosure with reference to scenarios involving enhanced component carriers, the described concepts may be generally applicable to other examples involving unlicensed or shared spectrum where multiple nodes may contend for a communications medium, and transmission across a plurality of carriers may not be guaranteed for each node during a particular time period.

A method of wireless communication is described. The method may include mapping one or more MBMS transport blocks to a plurality of carriers; performing a CCA on the plurality of carriers; selecting a portion of the one or more MBMS transport blocks to transmit based at least in part on a result of the CCA for the plurality of carriers; and transmitting, according to the mapping, the selected portion of the one or more MBMS transport blocks over one or more of the plurality of carriers for which the result of the CCA was a successful CCA.

An apparatus for wireless communication is described. The apparatus may include means for mapping one or more MBMS transport blocks to a plurality of carriers; means for performing a CCA on the plurality of carriers; means for selecting a portion of the one or more MBMS transport blocks to transmit based at least in part on a result of the CCA for the plurality of carriers; and means for transmitting, according to the mapping, the selected portion of the one or more MBMS transport blocks over one or more of the plurality of carriers for which the result of the CCA was a successful CCA.

Another apparatus for wireless communication is described. The apparatus may include a processor, memory in electronic communication with the processor, and instructions stored in the memory. The instructions may be executable by the processor to map one or more MBMS transport blocks to a plurality of carriers; perform a CCA on the plurality of carriers; select a portion of the one or more MBMS transport blocks to transmit based at least in part on a result of the CCA for the plurality of carriers; and transmit, according to the mapping, the selected portion of the one or more MBMS transport blocks over one or more of the plurality of carriers for which the result of the CCA was a successful CCA.

A non-transitory computer readable medium for wireless communication is described. The non-transitory computer-readable medium may include instructions executable by a processor to map one or more MBMS transport blocks to a plurality of carriers; perform a CCA on the plurality of carriers; select a portion of the one or more MBMS transport blocks to transmit based at least in part on a result of the CCA for the plurality of carriers; and transmit, according to the mapping, the selected portion of the one or more MBMS transport blocks over one or more of the plurality of carriers for which the result of the CCA was a successful CCA.

In some examples of the method, apparatuses, or non-transitory computer-readable medium, mapping the one or more MBMS transport blocks to the plurality of carriers may include operations, features, means, or instructions for mapping the one or more MBMS transport blocks over a system bandwidth comprising the plurality of carriers, and the one or more MBMS transport blocks may include a single MBMS transport block for the system bandwidth.

Some examples of the method, apparatuses, or non-transitory computer-readable medium may include operations, features, means, or instructions for puncturing the single MBMS transport block in a guard region of a first carrier for which the result of the CCA was a successful CCA and a second carrier for which the result of the CCA was a failed CCA, and the first carrier may be adjacent to the second carrier. Some examples of the method, apparatuses, or non-transitory computer-readable medium may include operations, features, means, or instructions for puncturing the single MBMS transport block in a carrier for which the result of the CCA was a failed CCA.

In some examples of the method, apparatuses, or non-transitory computer-readable medium, mapping the one or more MBMS transport blocks to the plurality of carriers may include operations, features, means, or instructions for mapping a unique MBMS transport block to the plurality of carriers.

Some examples of the method, apparatuses, or non-transitory computer-readable medium may include operations, features, means, or instructions for refraining from transmitting the unique MBMS transport block mapped to a carrier for which the result of the CCA was a failed CCA. In some examples, mapping the unique MBMS transport block to the plurality of carriers may include operations, features, means, or instructions for excluding a guard region of the plurality of carriers.

In some examples of the method, apparatuses, or non-transitory computer-readable medium, mapping the unique MBMS transport block to the plurality of carriers may include operations, features, means, or instructions for mapping the unique MBMS transport block to a guard region of the plurality of carriers. Some examples may include operations, features, means, or instructions for puncturing the unique MBMS transport block in the guard region of a first carrier for which the result of the CCA was a successful CCA, and the first carrier may be adjacent to a second carrier for which the result of the CCA was a failed CCA.

In some examples of the method, apparatuses, or non-transitory computer-readable medium, mapping the one or more MBMS transport blocks to the plurality of carriers may include operations, features, means, of instructions for mapping a redundancy version of the one or more MBMS transport blocks to the plurality of carriers.

Some examples of the method, apparatuses, or non-transitory computer-readable medium may include operations, features, means, or instructions for refraining from transmitting the redundancy version of an MBMS transport blocks mapped to a carrier for which the result of the CCA was a failed CCA. In some examples, mapping the redundancy version of the one or more MBMS transport blocks to the plurality of carriers may include operations, features, means, or instructions for excluding a guard region of the plurality of carriers.

In some examples of the method, apparatuses, or non-transitory computer-readable medium, mapping the redundancy version of the one or more MBMS transport blocks to the plurality of carriers may include operations, features, means, or instructions for mapping the redundancy version of the one or more MBMS transport blocks to a guard region of the plurality of carriers. Some examples of the method, apparatuses, or non-transitory computer-readable medium may include operations, features, means, or instructions for puncturing the redundancy version of the one or more MBMS transport blocks in the guard region of a first carrier for which the result of the CCA was a successful CCA, and the first carrier may be adjacent to a second carrier for which the result of the CCA was a failed CCA.

In some examples of the method, apparatuses, or non-transitory computer-readable medium, the redundancy version of the one or more MBMS transport blocks associated with the plurality of carriers may include a same redundancy version for of the plurality of carriers. In some examples of the method, apparatus, or non-transitory computer-readable medium, the redundancy version of the one or more MBMS transport blocks associated with the plurality of carriers may include a unique redundancy version for the plurality of carriers.

In some examples of the method, apparatuses, or non-transitory computer-readable medium, a MCS, a resource block, a version indicator, a transport block size (TBS) anchor, or a combination thereof for the redundancy version of the one or more MBMS transport blocks associated with the plurality of carriers may be indicated in a system information block (SIB), a multicast control channel (MCCH), radio resource control (RRC) signaling, or a combination thereof. In some examples of the method, apparatus, or non-transitory computer-readable medium, the redundancy version of the one or more MBMS transport blocks associated with the plurality of carriers may include systematic bits and parity bits.

DETAILED DESCRIPTION

Broadcasting cells (e.g., base stations) may use SFN technology to distribute broadcast streams into defined areas during the same radio time slot. SFN transmission for MBMS may be an effective way to achieve high broadcast capacity with multiple base stations transmitting the same contents in a synchronous fashion. SFN transmissions from different cells may use the same set of resources (e.g., a same set of one or more radio frequency spectrum bands) and MCS, which may appear to receiving UEs as a transmission from a single base station.

Extending MBMS, which may include evolved MBMS or eMBMS, to eCCs may result in improved signal quality and SFN gain in a shared radio frequency spectrum band (e.g., a radio frequency spectrum band that is licensed to multiple operators, a radio frequency spectrum band where users contend for access, an unlicensed radio frequency spectrum band, a radio frequency spectrum band that is licensed for some uses and is unlicensed for other uses, etc.). MBSFN on a shared radio frequency spectrum band may involve synchronized eCC base stations that perform LBT with a CCA or an eCCA. However, not all base stations may gain access to the shared radio frequency spectrum band, or the same portions thereof, during every time period.

Thus, an eCC base station may transmit eMBMS data on different portions of a shared radio frequency spectrum band (e.g., different bandwidths, different carriers, etc.) depending on the status of CCAs that are performed by the eCC base station. This may lead to a variable SFN deployment, but to achieve the signal strength gains base stations may still transmit identical content on the carrier(s) they use for transmission. In one example, each eMBMS service may be treated as a transmission over the system bandwidth (e.g., as a single TB). In another example, transmission of each MBSFN TB may be self-contained within a carrier (e.g., self-contained within a portion of the system bandwidth). In another example, a single MBSFN TB may be transmitted over a system bandwidth, but different RVs may be transmitted via individual carriers.

In some examples, an eCC may be referred to by different names in different radio access technologies. For example, in 5G, sometimes known as new radio (NR), an eCC may be referred to as NR shared spectrum. Aspects of the disclosure are initially described in the context of a wireless communication system. Narrative diagrams illustrate methods for eMBMS transmission in eCCs with variable accessible bandwidths in addition to examples of different MB SFN transmission scenarios. Aspects of the disclosure are further illustrated by and described with reference to apparatus diagrams, system diagrams, and flowcharts that relate to eMBMS in eCC over a variable transmission bandwidth.

Figure 1:
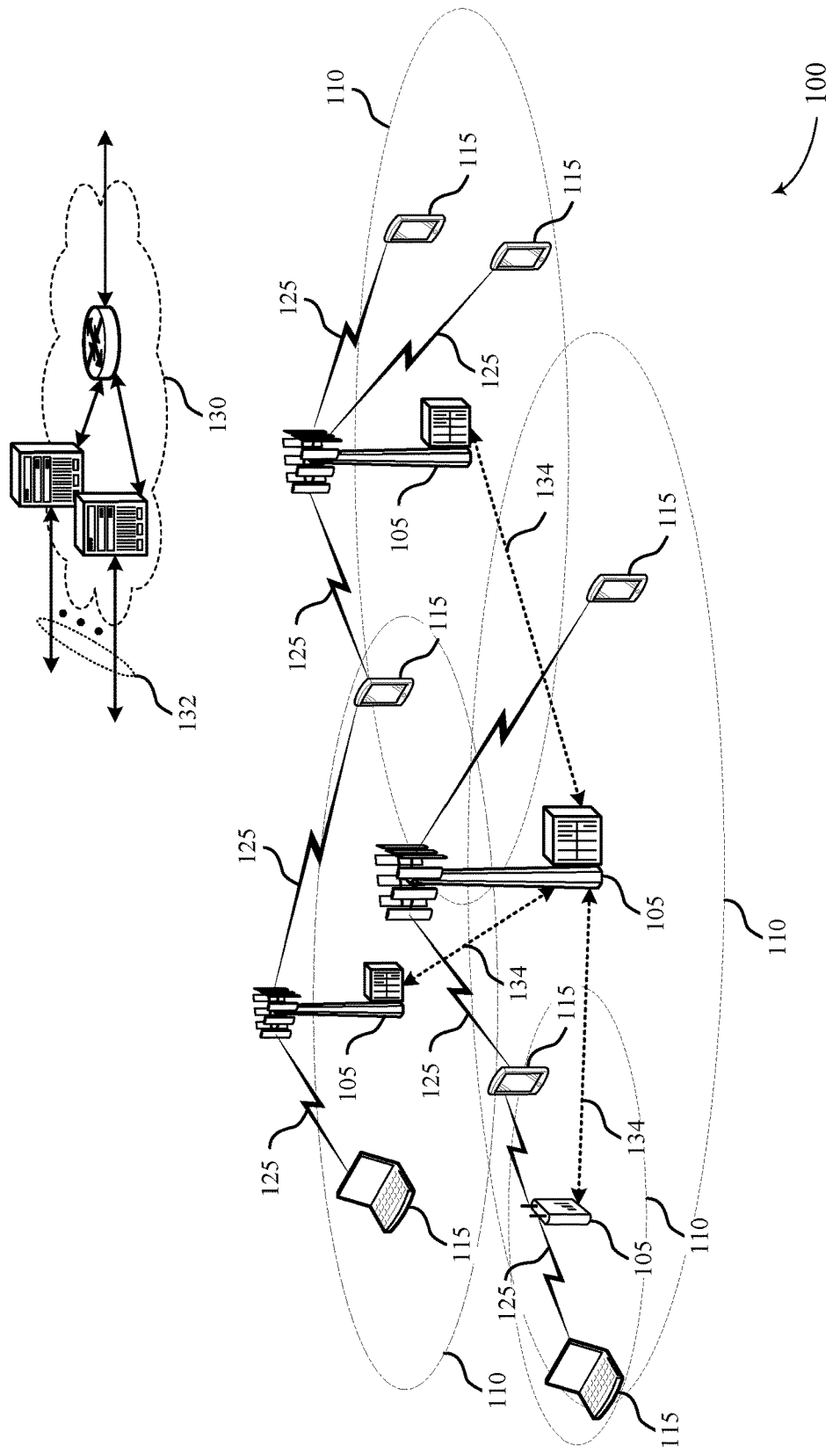
FIG. 1 illustrates an example of a wireless communications system that supports eMBMS in eCCs over a variable transmission bandwidth, in accordance with aspects of the present disclosure.

FIG. 1 illustrates an example of a wireless communications system 100 that supports eMBMS in eCCs over a variable transmission bandwidth, in accordance with aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Base stations 105 may support MBMS/eMBMS in eCCs using variable bandwidth transmissions. That is, one or more MBMS TBs may be mapped to a plurality of carriers, a CCA may be performed on the carriers, and a selected portion of the one or more MBMS TBs may be transmitted on those carriers for which the CCA was successful.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some base stations 105 may utilize a portion of the available downlink bandwidth to broadcast or multicast multimedia data to some or all UEs 115 within a geographic coverage area 110. For example, a wireless communication system may be configured to broadcast mobile TV content, or to multicast live event coverage to UEs 115 located near a live event such as a concert or sporting event. In some cases, broadcast or multicast may enable more efficient utilization of the bandwidth. These base stations may be referred to as MBMS or eMBMS cells. In some cases, MBMS cells may be grouped together in an MBSFN where the broadcast media is transmitted on the same frequency resources (e.g., a same radio frequency spectrum band, or same portions thereof) by each supporting cell. However, some UEs 115 in the coverage area may elect to not receive or otherwise process the MBMS data.

In some cases, a UE 115 or base station 105 (including MBSFN base stations 105) may operate in a shared radio frequency spectrum band (e.g., an unlicensed radio frequency spectrum band, a radio frequency spectrum band where accessing devices contend for access, etc.). These devices may perform a CCA prior to communicating in order to determine whether the channel is available. A CCA may include an energy detection procedure to determine whether there are other active transmissions at a particular time. For example, the device may infer that a change in a received signal strength indicator (RSSI) of a power meter indicates that a channel is occupied. Signal power that is concentrated in a certain bandwidth and exceeds a predetermined noise floor may indicate that another wireless transmitter is using that bandwidth. A CCA may also include detection of specific sequences that indicate use of the channel. For example, another device may transmit a specific preamble prior to transmitting a data sequence.

In some cases, the wireless communications system 100 may utilize one or more eCCs. An eCC may be characterized by one or more features, including wide bandwidth, short symbol duration, wide tone spacing, smaller transmission time intervals (TTIs), and operation in a shared radio frequency spectrum band. In some cases, an eCC may be associated with a carrier aggregation (CA) configuration or a dual connectivity configuration (e.g., when multiple serving cells have a suboptimal backhaul link).

Prior to transmission, data may be organized into TBs, which may be mapped to physical layer resources. To facilitate communications in the event that a transport block is not received correctly, or if greater redundancy is appropriate for an initial transmission, different versions of the TB known as RVs may be encoded and transmitted in a manner so that they may be combined with other RVs. RVs may contain the bits of the original TB (e.g., "systematic bits"), and may also contain encoded redundant bits known as parity bits.

Thus, a base station 105 supporting MBMS and operating in shared radio frequency spectrum band may map one or more MBMS TBs to a plurality of carriers of a system bandwidth. The base station 105 may then perform a CCA on one or more of the carriers (e.g., as a separate CCA for each of the carriers, a single CCA that otherwise assesses each of the carriers, etc.), and transmit the MBMS TBs, or portions thereof, that are mapped on those carriers for which the CCA was successful. The MBMS TBs, or portions thereof, that are mapped to carriers for which the CCA was unsuccessful may be punctured. In one example, a single TB may be mapped to the plurality of carriers (e.g., distributed across the plurality of carriers). In another example, different TBs are mapped to each of the plurality of carriers. In another example, different RVs are mapped to each of the plurality of carriers. In some cases, a region at the boundary of a carrier may be reserved for a guard region, and the guard region may not be used for MBMS transmissions when the carrier is associated with a failed CCA.

Figure 2:
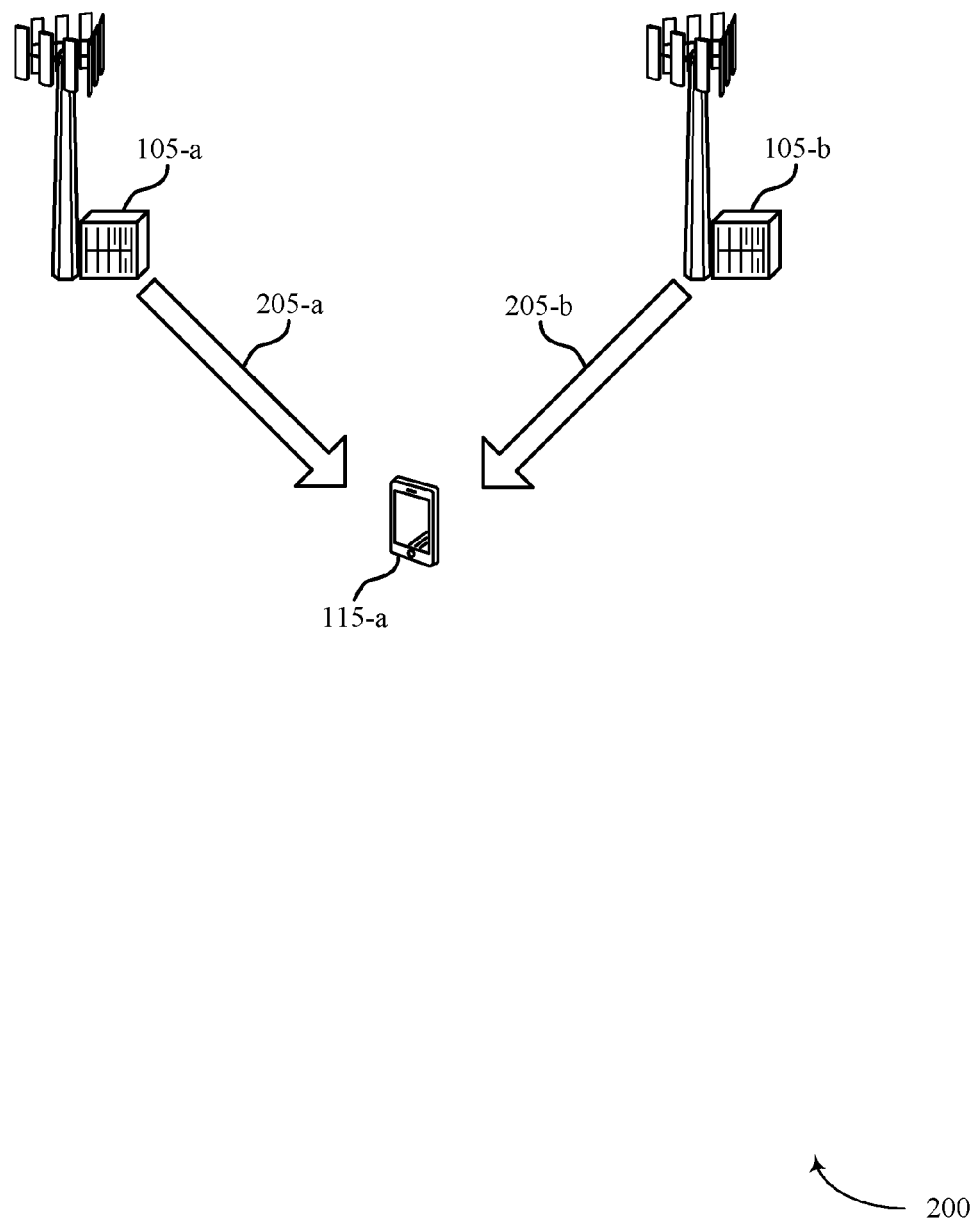
FIG. 2 illustrates an example of a wireless communications system that supports eMBMS in eCC over a variable transmission bandwidth, in accordance with aspects of the present disclosure.

FIG. 2 illustrates an example of a wireless communications system 200 that supports eMBMS in eCC over a variable transmission bandwidth, in accordance with aspects of the present disclosure. Wireless communications system 200 may include base stations 105-a and 105-b and UE 115-a, which may be examples of the corresponding devices described with reference to FIG. 1. One or more MBMS TBs may be mapped to a plurality of carriers used by the wireless communications system 200. Base stations 105-a and 105-b may then perform a CCA on the plurality of carriers, and transmit MBMS TBs, or portions thereof, that are mapped to those carriers for which the CCA was successful.

Base stations 105-a and 105-b may use SFN protocols to distribute broadcast streams into defined areas during the same radio time slot. SFN transmission in MBMS/eMBMS (e.g., MBSFN) may be an effective way to achieve high broadcast capacity with multiple base stations (e.g., base station 105-a and base station 105-b) transmitting the same contents in a synchronous or otherwise coordinated fashion. SFN transmissions from different cells (e.g., broadcast stream 205-a and broadcast stream 205-b) may use the same set of resources (e.g., a same radio frequency spectrum band, or same portions thereof, etc.) and MCS, such that the SFN transmissions may appear to UE 115-a as a transmission from a single base station, for example.

MBMS communications on a shared radio frequency spectrum band may involve LBT procedures based on a CCA or an eCCA. However, base station 105-a and base station 105-b may perform a CCA on each carrier independently and may not gain the same access to the communications medium during every time period. Thus, in an MBSFN application the base station 105-a and base station 105-b may transmit eMBMS data on different bandwidths (e.g., different carriers, etc.) depending on the status of the CCA for various carriers. This may lead to a variable SFN deployment, but to achieve the signal strength gains, base station 105-a and base station 105-b may still transmit identical content on those carrier(s) they use for transmission.

In one example, an MBMS service may be treated as a transmission over the system bandwidth (e.g., as a single TB distributed across a plurality of carriers of the system bandwidth). Rate matching and RVs of the TB may be defined based on the system bandwidth. Communication resources of a carrier for which a CCA was unsuccessful that are within the system bandwidth but unavailable to the base station may be punctured to ensure signal gain. That is, the MBMS data may be mapped over the whole system bandwidth, but the data mapped to carriers for which a CCA was successful may be transmitted. In some cases, a guard region bordering a carrier for which a CCA was unsuccessful may also be punctured. Resource puncturing on guard regions and non-available carriers may impact the systematic bits. Guard regions at the edge of the system bandwidth may not be used for transmission to avoid interference, in which case they may not impact rate matching.

In another example, transmission of each MBMS TB may be self-contained within a carrier (e.g., a portion of the system bandwidth). For example, each 20 MHz carrier of an 80 MHz system bandwidth may be associated with different TBs from the same service. A UE 115-a may combine the different TBs received on each carrier to achieve higher aggregated data rates. In some cases, base station 105-a may exclude guard regions within each carrier for an MBSFN transmission even if the base station 105-a simultaneously gains access to adjacent carriers. These guard regions may be used for unicast transmission, for example. In some examples, RVs of the TBs may be aligned, or may be defined independently for each carrier. In other cases, base station 105-b may use a guard region within each carrier for an MBSFN transmission if it gains access to multiple contiguous carriers (e.g., multiple carriers in adjacent radio frequency spectrum bands). To ensure MBSFN gain (e.g., synchronous transmission), resources in the guard region may be punctured for base stations (e.g., base station 105-a) where adjacent carriers are associated with a failed CCA.

In another example, a single MBMS TB may be transmitted over a system bandwidth, but different RVs associated with the single MBMS TB may be mapped to different carriers. Therefore, UE 115-a may combine RVs across multiple carriers to receive the associated MBMS communications. Encoding may be defined per carrier resource block (RB) assignment. Different carriers may have a different RB assignment and a different MCS. A TBS may be determined based on the MCS and RB assignment on one particular carrier (e.g., using a TBS anchor carrier). In some cases, a same (e.g., duplicated) RV may be mapped to all carriers for signal-to-noise ratio (SNR) combining gain. In other cases, different RVs may be mapped to different carriers, and subsequently combined by a UE for increased SNR and coding gain. In either case, the same carrier frequency (e.g., the same portion of a radio frequency spectrum bandwidth) as used by different base stations (e.g., base station 105-a and base station 105-b) may be associated with the same RV. The MCS, RB assignment, RV index, and TBS anchor carrier for an MBMS control channel (MCCH) or MBMS traffic channel (MTCH) may be indicated in a SIB or using RRC signaling. Furthermore, the RVs on different carriers may include systematic bits in addition to different parity bits to improve each carrier's self-decoding properties.

As in the example where each carrier is associated with a different TB, in some cases base stations may exclude a guard region for eMBMS transmission even if it simultaneously gains access to adjacent carriers. The base station (e.g., base station 105-b) may schedule unicast transmissions on these guard regions. For example, the MBSFN bandwidth may be limited to a central subband of each carrier. In other cases, the base station (e.g., base station 105-b) may use the guard region within each carrier for MBSFN transmission if it checks out multiple contiguous carriers. To ensure MBSFN gain, resources in the guard region may be punctured for base stations with adjacent carriers for which a CCA was unsuccessful (e.g., base station 105-a). In some cases, the same TB may not span the entire bandwidth (e.g., a first TB may span channel 0 and channel 1, while a second TB may span channel 2 and channel 3).

Figure 3:
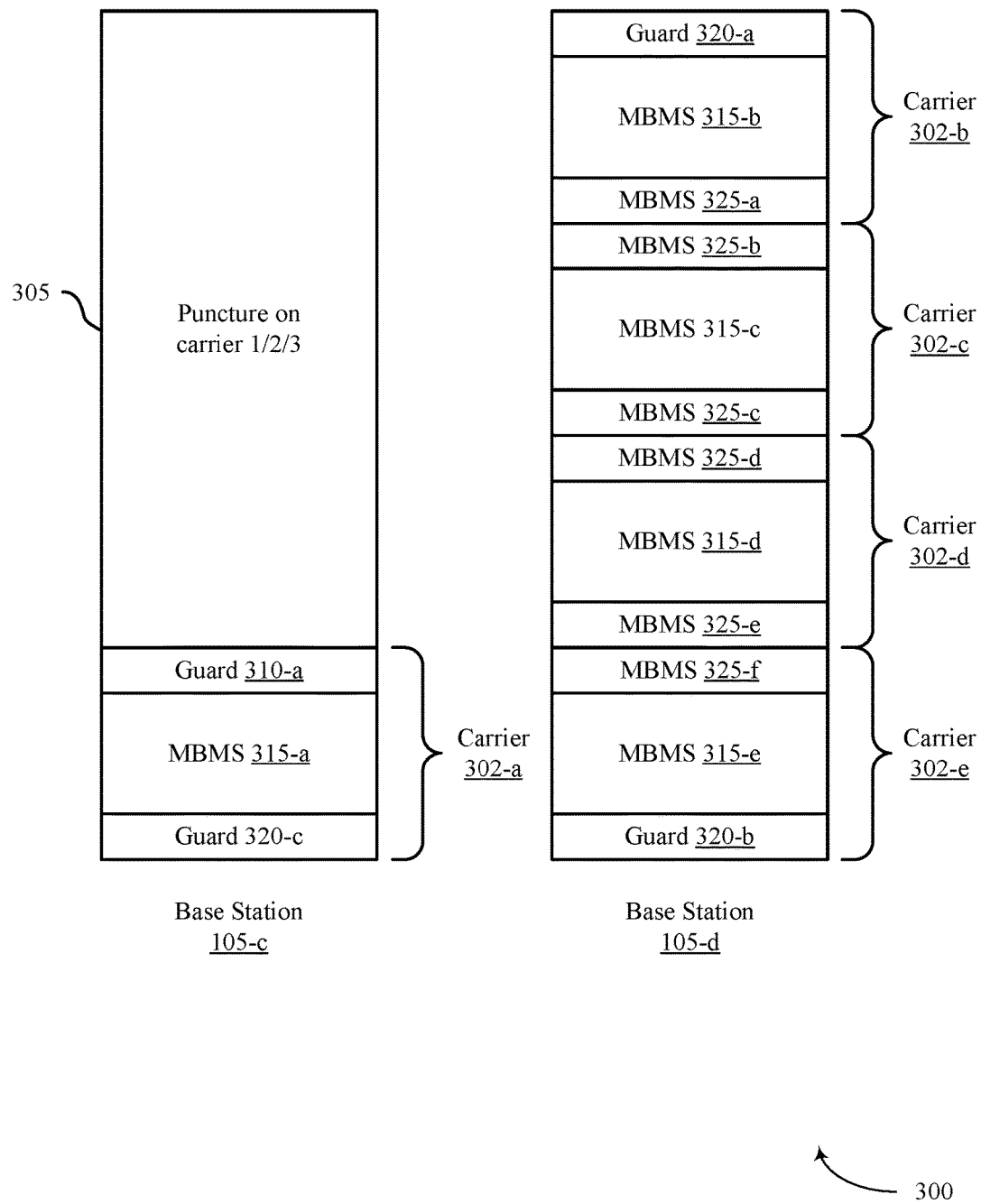
FIGS. 3, 4A, 4B, 5A, and 5B illustrate examples of carrier configurations in an MB SFN that support eMBMS in eCC over a variable transmission bandwidth, in accordance with aspects of the present disclosure.

FIG. 3 illustrates an example of a carrier configuration 300 in an MBSFN that supports eMBMS in eCC over a variable transmission bandwidth, in accordance with aspects of the present disclosure. Carrier configuration 300 may represent aspects of MBMS communications by a first base station 105-c and a second base station 105-d to one or more UEs 115, which may be examples of the respective devices as described with reference to FIGS. 1 and 2. Carrier configuration 300 may include carriers for the first base station 105-c and the second base station 105-d that share common carrier frequencies. For example, each of the carriers of the first base station 105-c may span the same radio frequency spectrum band as a corresponding carrier of the second base station 105-d, such as carrier 302-a of the first base station 105-c and carrier 302-e of the second base station 105-d spanning the same radio frequency spectrum bandwidth. As illustrated, carrier configuration 300 may represent an example in which an eMBMS service is treated as a transmission over the system bandwidth (e.g., as a single TB distributed across the system bandwidth).

In an example, an MB SFN including two or more base stations 105 (e.g., a first base station 105-c and a second base station 105-d) may transmit over a system bandwidth, some or all of which may be available to the first base station 105-c. RVs may be defined over the resource block assignment in the system bandwidth. In the example of the carrier configuration 300, the first base station 105-c may operate on a bandwidth smaller than the system bandwidth depending on the status of CCA(s) performed for the system bandwidth (e.g., one or more CCA(s) performed for carriers of the system bandwidth). To ensure MB SFN gain, carriers of the system bandwidth portion 305 (e.g., a group of carriers for which CCA(s) were unsuccessful) that are not available to the first base station may be punctured. Carriers 302-a, 302-b, 302-c, 302-d, and 302-e may represent carriers for which CCA(s) were successful, and may be subsequently used for MBMS transmission. Some carriers, such as carrier 302-a and carrier 302-e may span the same carrier frequency range and contain the same content.

Guard regions adjacent to frequency boundaries between carriers within the system bandwidth may either be an interior punctured guard region 310 (e.g., interior punctured guard region 310-a as shown within carrier 302-a) or an interior guard region MB SFN transmission 325 (e.g., interior guard region MB SFN transmissions 325-a, 325-b, 325-c, 325-d, 325-e, and 325-f as shown within carriers 302-b, 302-c, 302-d, and 302-e). Non-punctured guard regions 320 (e.g., non-punctured guard regions 320-a, 320-b, and 320-c as shown within carriers 302-a, 302-b, and 302-e) adjacent to a frequency boundary of an MBSFN system bandwidth, which may not have an MBMS TB, or portion thereof, mapped to them, may be used to avoid interference.

MBMS transmissions 315 may be located between the non-punctured guard region 320 and the interior punctured guard region 310 for the first base station 105-*c* (e.g., MBMS transmissions 315-*a* as shown within carrier 302-*a*). MBMS transmissions 315 for the second base station 105-*d* may be located in all of the carriers of the second base station (e.g., MBMS transmissions 315-*b*, 315-*c*, 315-*d*, and 315-*e* as shown within carriers 302-*b*, 302-*c*, 302-*d*, and 302-*e*). Thus, by gaining access to each of the carrier frequencies of the MBSFN system bandwidth, the second base station 105-*d* may transmit the entire MBMS TB that is mapped to the MBSFN system bandwidth (e.g., MBMS transmissions 315-*b*, 315-*c*, 315-*d*, and 315-*e*, and interior guard region MBSFN transmissions 325-*a*, 325-*b*, 325-*c*, 325-*d*, 325-*e*, and 325-*f*, representing the entirety of the MBSFN system bandwidth to which an MBMS TB is mapped, which excludes the non-punctured guard regions 320-*a* and 320-*b* at the frequency boundaries of the MBSFN system bandwidth).

Figure 4A:
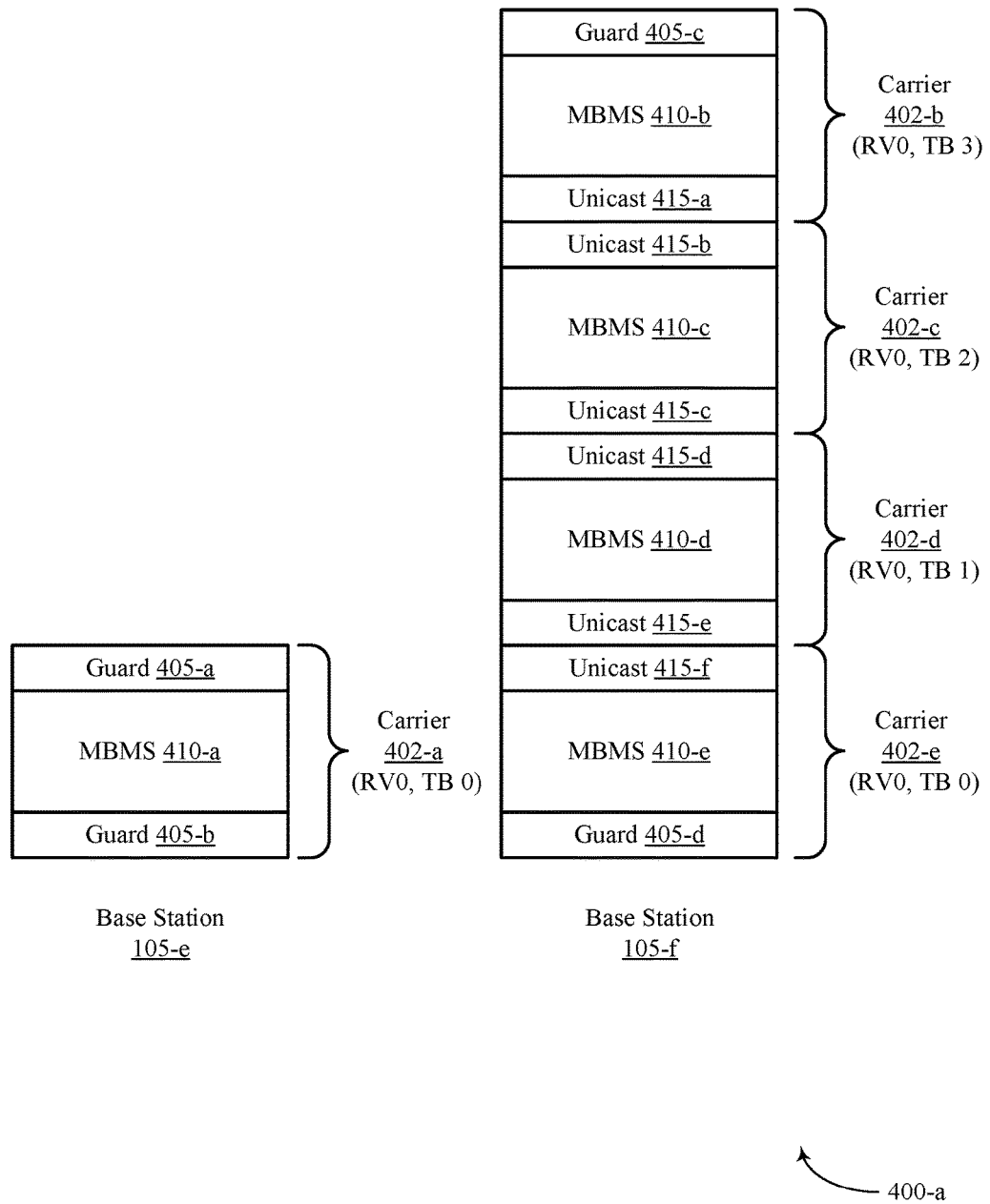

FIG. 4A illustrates an example of a carrier configuration 400-*a* in an MBSFN that supports eMBMS in eCC over a variable transmission bandwidth, in accordance with aspects of the present disclosure. Carrier configuration 400-*a* may represent aspects of MBMS communications by a first base station 105-*e* and a second base station 105-*f* to one or more UEs 115, which may be examples of the respective devices as described with reference to FIGS. 1 and 2. Carrier configuration 400-*a* may include carriers for the first base station 105-*e* and the second base station 105-*f* that share common carrier frequencies (e.g., each of the carriers of the first base station 105-*e* may span the same radio frequency spectrum band as a corresponding carrier of the second base station 105-*f*). As illustrated, carrier configuration 400-*a* represents an example in which transmission of each unique MBMS TB may be self-contained within a single carrier (e.g., a portion of the system bandwidth). In such examples, a same TB may be mapped to carriers of different base stations that share a carrier frequency (e.g., TB 0 as mapped to carrier 402-*a* of the first base station 105-*e* and also mapped to carrier 402-*e* of the second base station 105-*f*). In some examples, TBs may be mapped without using redundancy versions (e.g., each TB may be transmitted as RV0, as shown). In other examples, a TB may be mapped to another carrier with another redundancy version (e.g., TB 0, RV0 of carrier 402-*e* and TB 0, RV1 mapped to another carrier, not shown.). Carrier configuration 400-*a* further represents an example in which guard regions are not used for mapping MBMS transmissions (e.g., where guard regions are reserved within each carrier as edge guard regions, reserved for unicast transmission, etc.).

For example, different TBs may be transmitted on each carrier 402 of a first base station 105-*e* and a second base station 105-*f*. If the first base station 105-*e* does not gain access to a carrier (e.g., the first three carriers 402, not shown for the first base station 105-*e*, for which a result of a CCA by the first base station 105-*e* for the respective carriers was an unsuccessful CCA) the first base station 105-*e* may not transmit over those carriers. The first base station 105-*e* may transmit an MBMS transmission 410-*a* between non-punctured guard regions 405-*a* and 405-*b* (e.g., guard regions for which MBMS data has not been mapped) adjacent to frequency boundaries of the first base station's available bandwidth (e.g., within the frequency boundaries of carrier 402-*a* in the example of carrier configuration 400-*a*). In some examples, the MBMS transmission 410-*a* by the first base station 105-*e* may be the entirety of the TB for the carrier 402-*a*, despite not transmitting on non-punctured guard regions 405-*a* and 405-*b*, because MBMS data may not be mapped to the non-punctured guard regions 405-*a* and 405-*b*.

The second base station 105-*f* (which, in this example, has performed successful CCA(s) for each of the carriers 402-*b*, 402-*c*, 402-*d*, and 402-*e*) may transmit MBMS transmissions 410-*b*, 410-*c*, 410-*d*, and 410-*e* between the non-punctured guard regions 405-*c* and 405-*d* adjacent to the available bandwidth (e.g., as in carriers 402-*b* and 402-*e*), and may transmit unicast data on guard regions 415-*a*, 415-*b*, 415-*c*, 415-*d*, 415-*e*, and 415-*f* that are adjacent to frequency boundaries between carriers that are within the available bandwidth (e.g., as in carriers 402-*b*, 402-*c*, 402-*d*, and 402-*e*). In some examples, the MBMS transmissions 410 by the second base station 105-*f* may be the entirety of the TBs mapped to each of the carriers 402-*b*, 402-*c*, 402-*d*, and 402-*e*, despite not transmitting MBMS on the guard bands, because MBMS data may not be mapped to the guard regions in the example of carrier configuration 400-*a*.

Figure 4B:
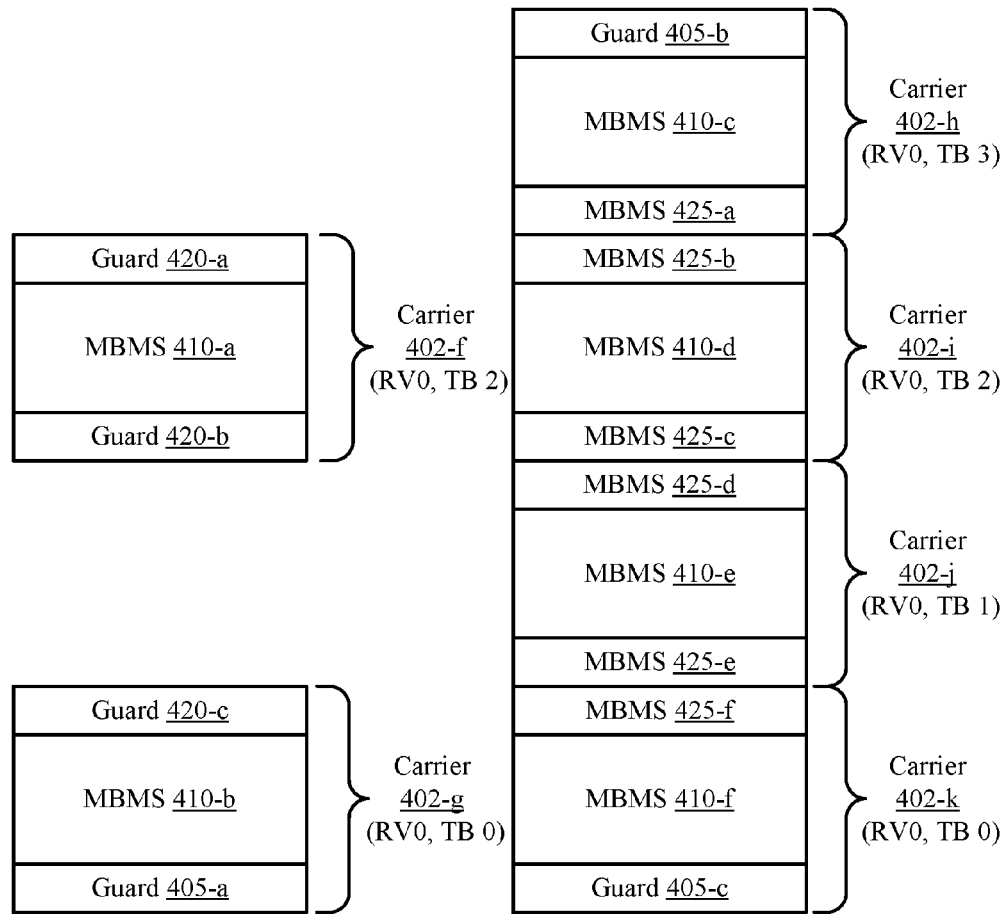

FIG. 4B illustrates an example of a carrier configuration 400-*b* in an MBSFN that supports eMBMS in eCC over a variable transmission bandwidth, in accordance with aspects of the present disclosure. Carrier configuration 400-*b* may represent aspects of MBMS communications by a first base station 105-*g* and a second base station 105-*h* to one or more UEs 115, which may be examples of the respective devices as described with reference to FIGS. 1 and 2. Carrier configuration 400-*b* may include carriers for the first base station 105-*g* and the second base station 105-*h* that share common carrier frequencies (e.g., each of the carriers of the first base station 105-*g* may span the same radio frequency spectrum band as a corresponding carrier of the second base station 105-*h*). As illustrated, carrier configuration 400-*b* represents an example in which transmission of each unique MBMS TB may be self-contained within a single carrier (e.g., a portion of the system bandwidth). In such examples, a same TB may be mapped to carriers of different base stations that share a carrier frequency (e.g., TB 0 as mapped to carrier 402-*g* of the first base station 105-*g* and also mapped to carrier 402-*k* of the second base station 105-*h*, and TB 2 as mapped to carrier 402-*f* of the first base station 105-*g* and also mapped to carrier 402-*i* of the second base station 105-*h*). In some examples, TBs may be mapped without using redundancy versions (e.g., each TB may be transmitted as RV0, as shown). In other examples, a TB may be mapped to another carrier with another redundancy version (e.g., TB 0, RV0 of carrier 402-*k* and TB 0, RV1 mapped to another carrier, not shown.). Carrier configuration 400-*b* further represents an example in which the MBMS TBs are mapped to guard regions within each carrier that may be punctured when a base station 105 does not gain access to an adjacent carrier.

For example, different TBs may be transmitted on each carrier. In some cases the results of CCA procedure(s) may enable the first base station 105-*g* to check out some, but not all, carriers within the system bandwidth (e.g., carrier 402-*f* and carrier 402-*g*). The first base station 105-*g* may transmit an MBMS transmission 410-*a* in the region of carrier 402-*f* between punctured interior guard regions 420-*a* and 420-*b* (e.g., adjacent to the upper and lower frequency boundaries of carrier 402-*f*) as well as an MBMS transmission 410-*b* between non-punctured guard region 405-*a* at the MBSFN system bandwidth edge and the nearest punctured interior guard region 420-*c*. In some examples, the MBMS transmissions 410-*a* and 410-*b* by the first base station 105-*g* may not be the entirety of the TBs for the respective carriers, because portions of the MBMS TBs mapped to punctured interior guard regions 420-*a*, 420-*b* and 420-*c* are not transmitted due to the unsuccessful CCAs on adjacent carriers.

The second base station 105-*h* (which, in this example, gains access to the total MBSFN system bandwidth) may transmit MBMS transmissions 410-*c*, 410-*d*, 410-*e*, and 410-*f* as well as guard region MBMS transmissions 425-*a*, 425-*b*, 425-*c*, 425-*d*, 425-*e*, and 425-*f* (e.g., MBMS transmissions on internal guard regions of carriers 402-*h*, 402-*i*, 402-*j*, and 402-*k* that border each other within the MBSFN system bandwidth), between the non-punctured guard regions 405-*b* and 405-*c* that are adjacent to the upper and lower frequency boundaries of the MBSFN system bandwidth. In some examples, the combinations of MBMS transmissions 410 and guard region MBMS transmissions 425 by the second base station 105-*h* may be the entirety of the TBs for each of the respective carriers, because portions of the MBMS TBs mapped to internal guard regions are transmitted due to the successful CCA on all carriers, and because non-punctured guard regions 405 at the edge of the MBSFN system bandwidth may not have portions of the associated TBs mapped thereto.

Figure 5A:
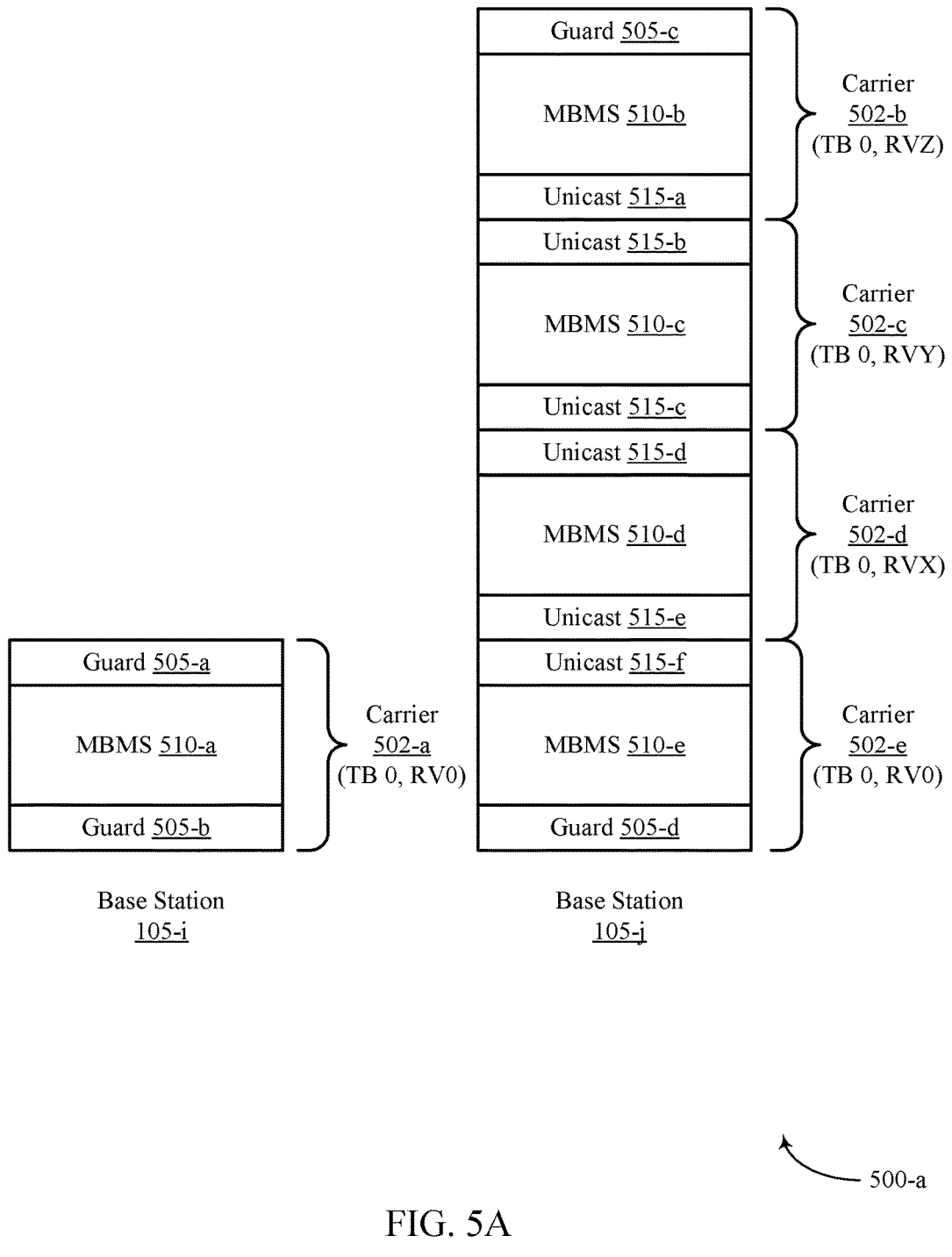

FIG. 5A illustrates an example of a carrier configuration 500-*a* in an MBSFN that supports eMBMS in eCC over a variable transmission bandwidth, in accordance with aspects of the present disclosure. Carrier configuration 500-*a* may represent aspects of MBMS communications by a first base station 105-*i* and a second base station 105-*j* to one or more UEs 115, which may be examples of the respective devices as described with reference to FIGS. 1 and 2. Carrier configuration 500-*a* may include carriers for the first base station 105-*i* and the second base station 105-*j* that share common carrier frequencies (e.g., each of the carriers of the first base station 105-*i* may span the same radio frequency spectrum band as a corresponding carrier of the second base station 105-*j*). In such examples, a same RV of a TB may be mapped to carriers of different base stations that share a carrier frequency (e.g., TB 0 RV0 as mapped to carrier 502-*a* of the first base station 105-*i* and also mapped to carrier 502-*e* of the second base station 105-*j*). As illustrated, carrier configuration 500-*a* represents an example in which different RVs of a TB may be mapped to, and subsequently transmitted on different carriers. Carrier configuration 500-*a* further represents an example in which guard regions are not used for mapping MBMS transmissions (e.g., where guard regions are reserved within each carrier as edge guard regions, reserved for unicast transmission, etc.).

If the first base station 105-*i* does not gain access to a carrier 502 (e.g., the first three carriers, not shown for the first base station 105, for which CCA(s) were unsuccessful) the first base station 105-*i* may not transmit the RVs that have been mapped to those carriers. The first base station 105-*i* may transmit an MBMS transmission 510-*a* between non-punctured guard regions 505-*a* and 505-*b* (e.g., guard regions for which MBMS data has not been mapped) at the boundaries of the bandwidth it has gained access to. In some examples, the MBMS transmission 510-*a* by the first base station 105-*j* may be the entirety of the RV of the TB (e.g., RV0) for the carrier 502-*a*, despite not transmitting on non-punctured guard regions 505-*a* and 505-*b*, because MBMS data may not be mapped to the non-punctured guard regions 505-*a* and 505-*b*.

The second base station 105-*j* (which, in this example, gains access to the total MBSFN system bandwidth) may transmit MBMS transmissions 510-*b*, 510-*c*, 510-*d*, and 510-*e* in the region between the non-punctured guard regions 505-*c* and 505-*d* at the edges of the MBSFN system bandwidth. Interior guard regions 515-*a*, 515-*b*, 515-*c*, 515-*d*, 515-*e*, and 515-*f* (e.g., as included in carriers 502-*b*, 502-*c*, 502-*d*, and 502-*e*) may be used for unicast data (e.g., because the interior guard regions 515 are adjacent to carriers for which CCA procedure(s) were successful). In some examples, the MBMS transmissions 510 by the second base station 105-*j* may be the entirety of the RVs of the TB for each of the carriers 502-*b*, 502-*c*, 502-*d*, and 502-*e* (e.g., RVs 0, X, Y, and Z, respectively), despite not transmitting on the non-punctured guard regions 505-*c* and 505-*d*, because MBMS data may not be mapped to the non-punctured guard regions 505-*c* and 505-*d*.

Figure 5B:
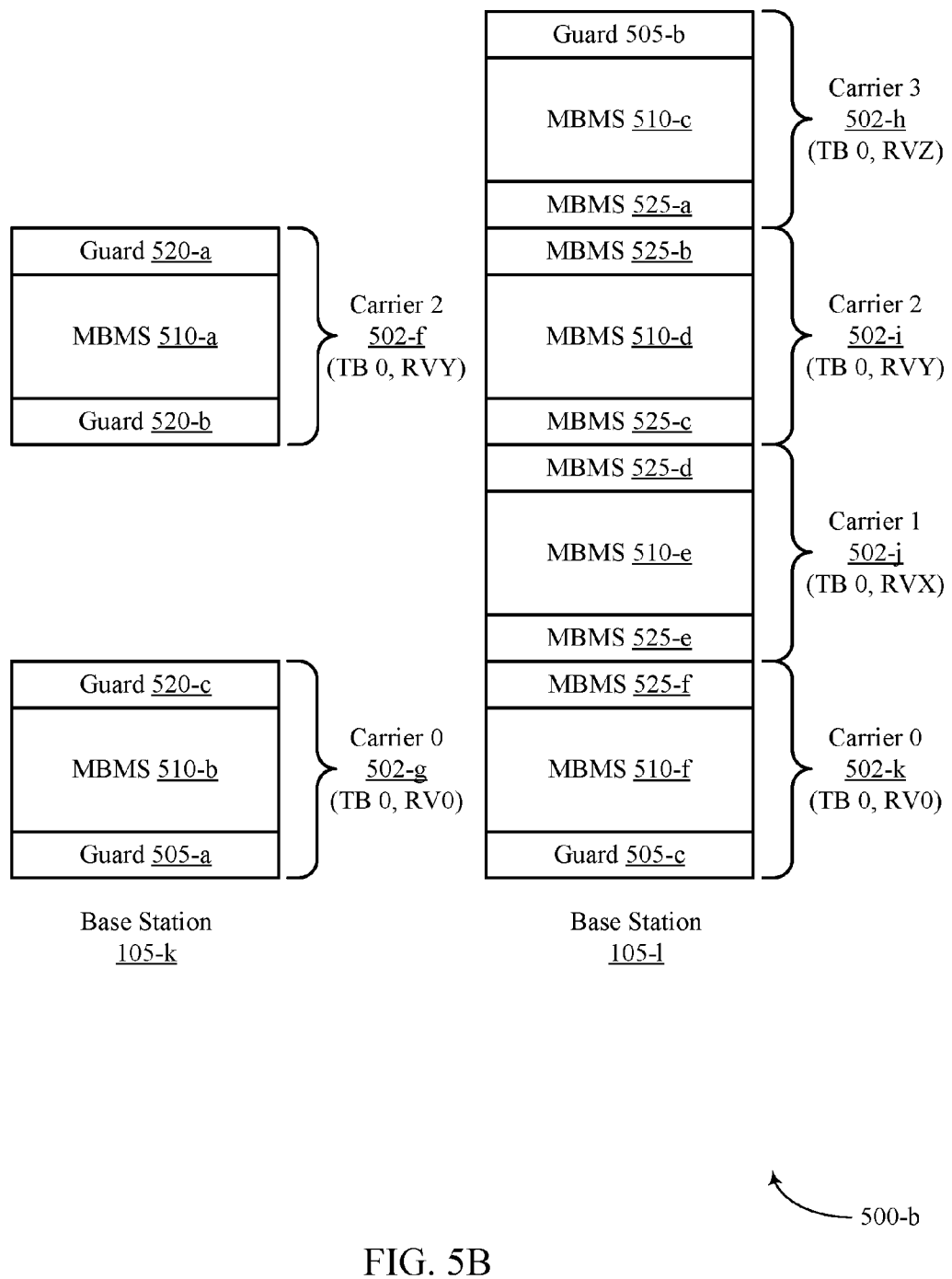

FIG. 5B illustrates an example of a carrier configuration 500-*b* in an MBSFN that supports eMBMS in eCC over a variable transmission bandwidth, in accordance with aspects of the present disclosure. Carrier configuration 500-*b* may represent aspects of MBMS communications by a first base station 105-*k* and a second base station 105-*l* to one or more UEs 115, which may be examples of the respective devices as described with reference to FIGS. 1 and 2. Carrier configuration 500-*b* may include carriers for the first base station 105*k* and the second base station 105-*l* that share common carrier frequencies (e.g., each of the carriers of the first base station 105-*k* may span the same radio frequency spectrum band as a corresponding carrier of the second base station 105-*l*). In such examples, a same RV of a TB may be mapped to carriers of different base stations that share a carrier frequency (e.g., TB 0 RV0 as mapped to carrier 502-*g* of the first base station 105-*k* and also mapped to carrier 502-*k* of the second base station 105-*l*). As illustrated, carrier configuration 500-*b* represents an example in which different RVs of a TB may be transmitted on different carriers. Carrier configuration 500-*b* further represents an example in which the MBMS TB s are mapped to guard regions within each carrier that may be punctured when a base station 105 does not win access to adjacent bands.

In some cases, the results of the CCA(s) may enable the first base station 105-*k* to gain access to some, but not all, carriers within the system bandwidth. The first base station 105-*k* may transmit MBMS transmission 510-*a* between punctured interior guard regions 520-*a* and 520-*b* (e.g., adjacent to the frequency boundaries of a carrier within the system bandwidth as in carrier 502-*f*) as well as between non-punctured guard region 505-*a* adjacent to the frequency boundary of the MBSFN system bandwidth and punctured interior guard region 520-*c* (e.g., as in carrier 502-*g*). In some examples, the MBMS transmissions 510-*a* and 510-*b* by the first base station 105-*i* may not be the entirety of the RVs of the TB for the respective carriers, because portions of the MBMS TBs mapped to punctured interior guard regions 520-*a*, 520-*b*, and 520-*c* are not transmitted due to the unsuccessful CCAs on adjacent carriers.

The second base station 105-*l* (which, in this example, gains access to the total MBSFN system bandwidth) may transmit MBMS transmissions 510-*c*, 510-*d*, 510-*e*, and 510-*f* as well as guard region MBMS transmissions 525-*a*, 525-*b*, 525-*c*, 525-*d*, 525-*e*, and 525-*f* (e.g., MBMS transmissions on internal guard regions of carriers 502-*h*, 502-*i*, 502-*j*, and 502-*k* that are adjacent to carriers within the MBSFN system bandwidth), between the non-punctured guard regions 505-*b* and 505-*c* that are adjacent to the upper and lower frequency boundaries of the MBSFN system bandwidth. In some examples, the combination of MBMS transmissions 510 and guard region MBMS transmissions 525 by the second base station 105-*j* may be the entirety of the RVs of the TB for each of the respective carriers, because portions of the MBMS TB RVs mapped to internal guard regions are transmitted due to the successful CCA on all carriers, and because non-punctured guard regions 505 may not have portions of the associated TB RVs mapped thereto.

Figure 6:
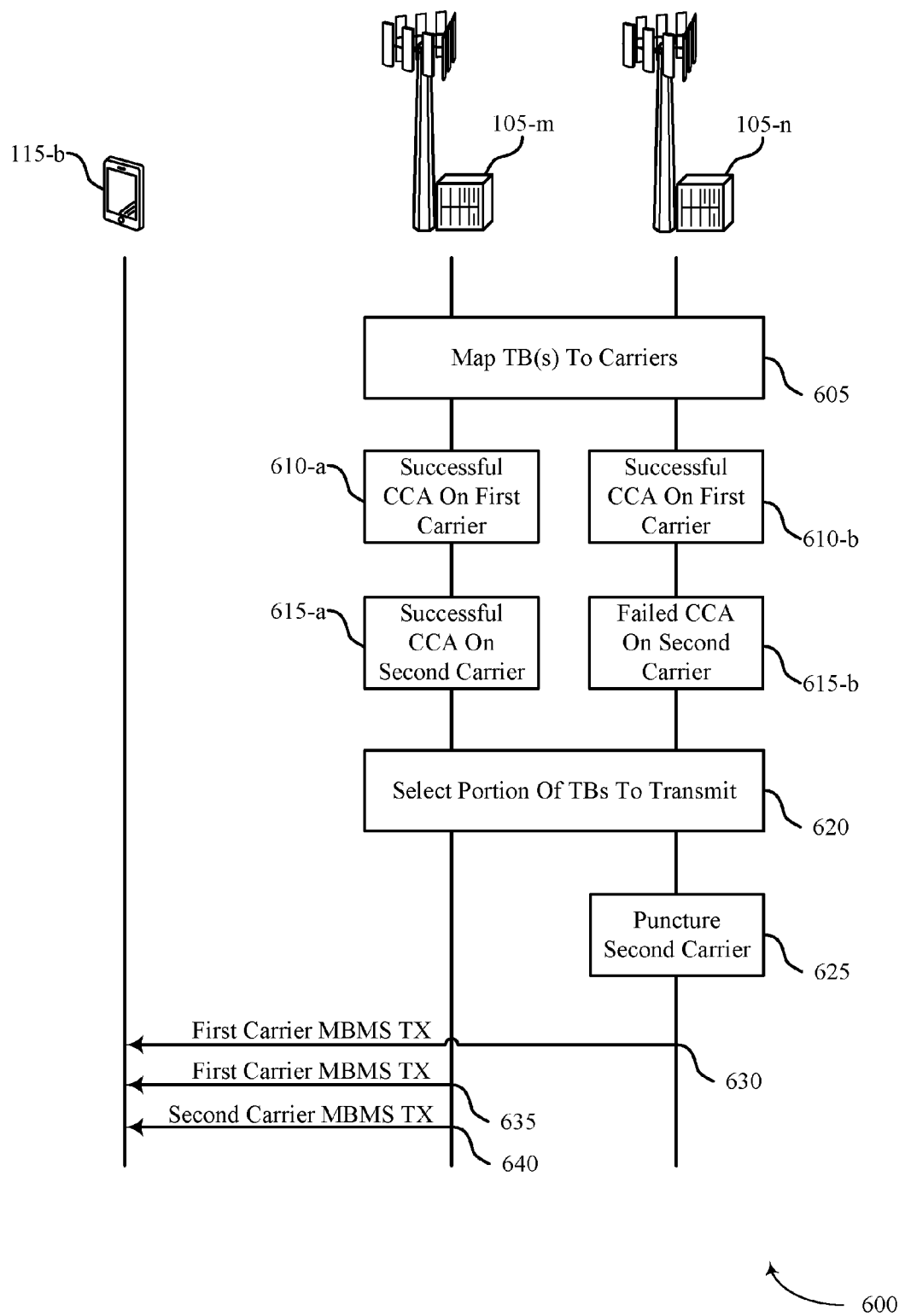
FIG. 6 illustrates an example of a process flow that supports eMBMS in eCC over a variable transmission bandwidth, in accordance with aspects of the present disclosure.

FIG. 6 illustrates an example of a process flow 600 that supports eMBMS in eCC over a variable transmission bandwidth, in accordance with aspects of the present disclosure. Process flow 600 may be performed by base stations 105-*m* and 105-*n* and UE 115-*b*, which may be examples of the corresponding devices described with reference to FIGS. 1 through 5B.

At 605, base station 105-*m* and base station 105-*n* may map one or more MBMS TBs to a plurality of carriers in shared radio frequency spectrum band. In some cases a single TB is mapped across the whole system bandwidth, as described above with reference to FIG. 3, for example. In other cases, individual TBs or RVs are mapped to different carriers, as described above with reference to FIGS. 4A through 5B, for example.

At 610-*a*, the base station 105-*m* may perform a successful CCA on a first carrier to gain access to that carrier. At 610-*b*, the base station 105-*m* may also perform a successful CCA to gain access to a first carrier, which may have the same carrier frequency, or span the same carrier frequency bandwidth as the first carrier of the base station 105-*m* (e.g., as in an MBSFN application).

At 615-*a*, the base station 105-*m* may perform a successful CCA on a second carrier. At 615-*b*, the base station 105-*n* may perform an unsuccessful CCA on a second carrier, which may have the same carrier frequency, or span the same carrier frequency bandwidth as the second carrier of the base station 105-*m* (e.g., as in an MBSFN application). That is, both base station 105-*m* and base station 105-*n* may perform an LBT procedure for each carrier frequency of a system operating at least partially within a shared radio frequency spectrum band. Some of the carriers may be associated with a successful CCA and some may be associated with an unsuccessful CCA.

At 620, base station 105-*m* and base station 105-*n* may each select at least a portion of the one or more mapped MBMS TBs to transmit, based on the results of CCA(s) for the carriers. For example, base station 105-*m* may select the portion of the MBMS TB(s) mapped to both the first and second carrier of the base station 105-*m*, while base station 105*n* may select the portion mapped to the first carrier of the base station 105-*n*.

At 625, base station 105-*n* may puncture the portion of the MBMS TB(s) mapped to the carriers associated with the unsuccessful CCA. For example, base station 105-*n* may puncture the transmission on the second carrier of the base station 105-*n*.

At 630, base station 105-*n* may transmit the portion of the MBMS TB(s) mapped to the first carrier of the base station 105-*n*. At 635, base station 105-*m* may transmit the portion of the MBMS TB(s) mapped to the first carrier. At 640, base station 105-*m* may transmit the portion of the MBSFN TB(s) mapped to the second carrier. That is, each base station 105 may transmit MBMS TB(s), or portions thereof, mapped to those carriers that are associated with successful CCA(s).

Figure 7:
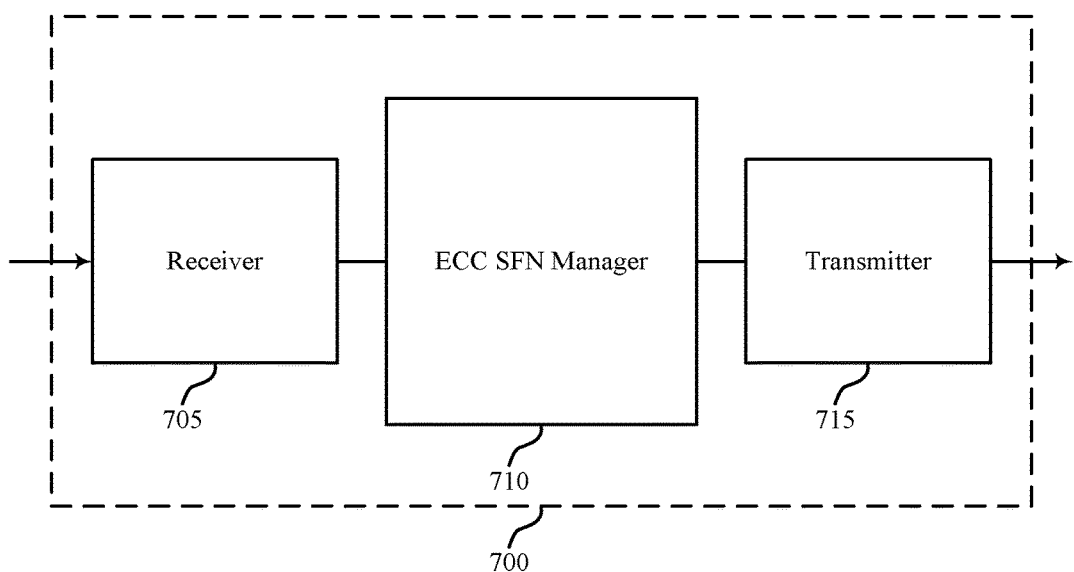
FIGS. 7 and 8 show diagrams of wireless devices that support eMBMS in eCC over a variable transmission bandwidth, in accordance with aspects of the present disclosure.

FIG. 7 shows a diagram of a wireless device 700 that supports eMBMS in eCC over a variable transmission bandwidth, in accordance with aspects of the present disclosure. Wireless device 700 may be an example of aspects of a base station 105 described with reference to FIGS. 1 through 6. Wireless device 700 may include receiver 705, an eCC SFN manager 710, and a transmitter 715. Wireless device 700 may also include a processor. Each of these components may be in communication with each other.

The receiver 705 may receive information such as packets, user data, or control information associated with various information channels (e.g., control channels, data channels, and information related to eMBMS in eCC over a variable transmission bandwidth, etc.). Received information may be passed on to other components of the device. The receiver 705 may be an example of aspects of the transceiver 1025 described with reference to FIG. 10. The receiver 705 may include a single antenna, or it may include a plurality of antennas.

The eCC SFN manager 710 may map one or more MBMS TBs to a plurality of carriers, perform a CCA (e.g., in cooperation with the receiver 705 and/or the transmitter 715) on the plurality of carriers, select a portion of the one or more MBMS TBs to transmit based at least in part on a result of the CCA for the plurality of carriers, and transmit (e.g., in cooperation with the transmitter 715), according to the mapping, the selected portion of the one or more MBMS TBs over one or more of the plurality of carriers for which the result of the CCA was a successful CCA. The eCC SFN manager 710 may also be an example of aspects of the eCC SFN manager 1005 described with reference to FIG. 10.

The transmitter 715 may transmit signals received from other components of wireless device 700. In some examples, the transmitter 715 may be collocated with a receiver in a transceiver module. For example, the transmitter 715 may be an example of aspects of the transceiver 1025 described with reference to FIG. 10. The transmitter 715 may include a single antenna, or it may include a plurality of antennas.

Figure 8:
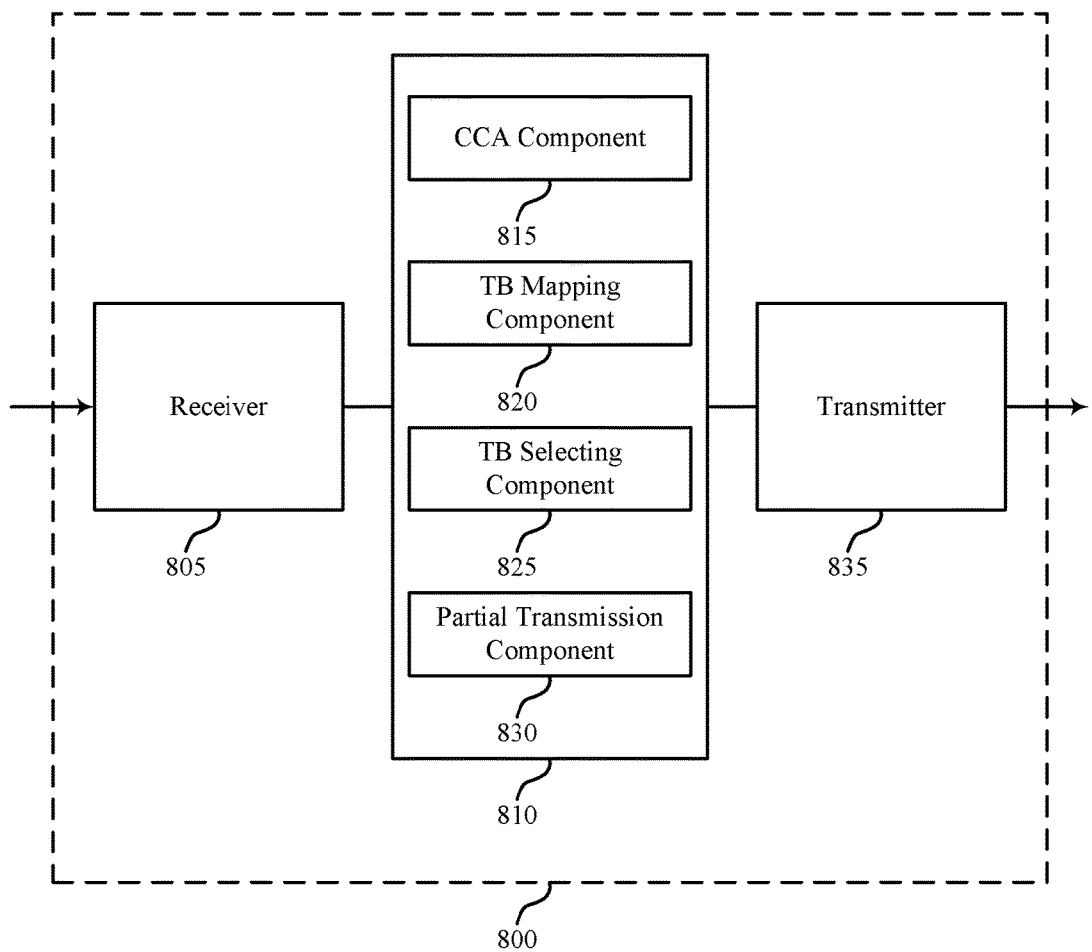

FIG. 8 shows a diagram of a wireless device 800 that supports eMBMS in eCC over a variable transmission bandwidth, in accordance with aspects of the present disclosure. Wireless device 800 may be an example of aspects of a wireless device 700 or a base station 105 described with reference to FIGS. 1 through 7. Wireless device 800 may include a receiver 805, an eCC SFN manager 810 and a transmitter 835. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10.

The eCC SFN manager 810 may be an example of aspects of eCC SFN manager 710 described with reference to FIG. 7. The eCC SFN manager 810 may include a CCA component 815, a TB mapping component 820, a TB selecting component 825, and a partial transmission component 830. The eCC SFN manager 810 may be an example of aspects of the eCC SFN manager 1005 described with reference to FIG. 10.

The CCA component 815 may perform a CCA (e.g., in cooperation with the receiver 805 and/or the transmitter 835) on the plurality of carriers. For example, the plurality of carriers may be within a shared radio frequency spectrum band, and the CCA component 815 may determine whether one or more of the plurality of carriers are available prior to transmitting.

The TB mapping component 820 may map one or more MBMS TBs to a plurality of carriers. In some examples, mapping the one or more MBMS TBs to the plurality of carriers may include mapping the one or more MBMS TB over a system bandwidth comprising the plurality of carriers, and the one or more MBMS TBs may include a single MBMS TB for the system bandwidth. In some examples, mapping the one or more MBMS TBs to the plurality of carriers may include mapping a unique MBMS transport block to each of the plurality of carriers. In some examples, mapping the one or more MBMS TBs to the plurality of carriers may include mapping a redundancy version of the one or more MBMS transport blocks to each of the plurality of carriers.

The TB selecting component 825 may select a portion of the one or more MBMS TBs to transmit based at least in part on a result of the CCA for the plurality of carriers. The partial transmission component 830 may transmit (e.g. in cooperation with the transmitter 835) the selected portion of the one or more MBMS TBs according to the mapping over one or more of the plurality of carriers that passed the CCA.

The transmitter 835 may transmit signals received from other components of wireless device 800. In some examples, the transmitter 835 may be collocated with a receiver in a transceiver module. For example, the transmitter 835 may be an example of aspects of the transceiver 1025 described with reference to FIG. 10.

Figure 9:
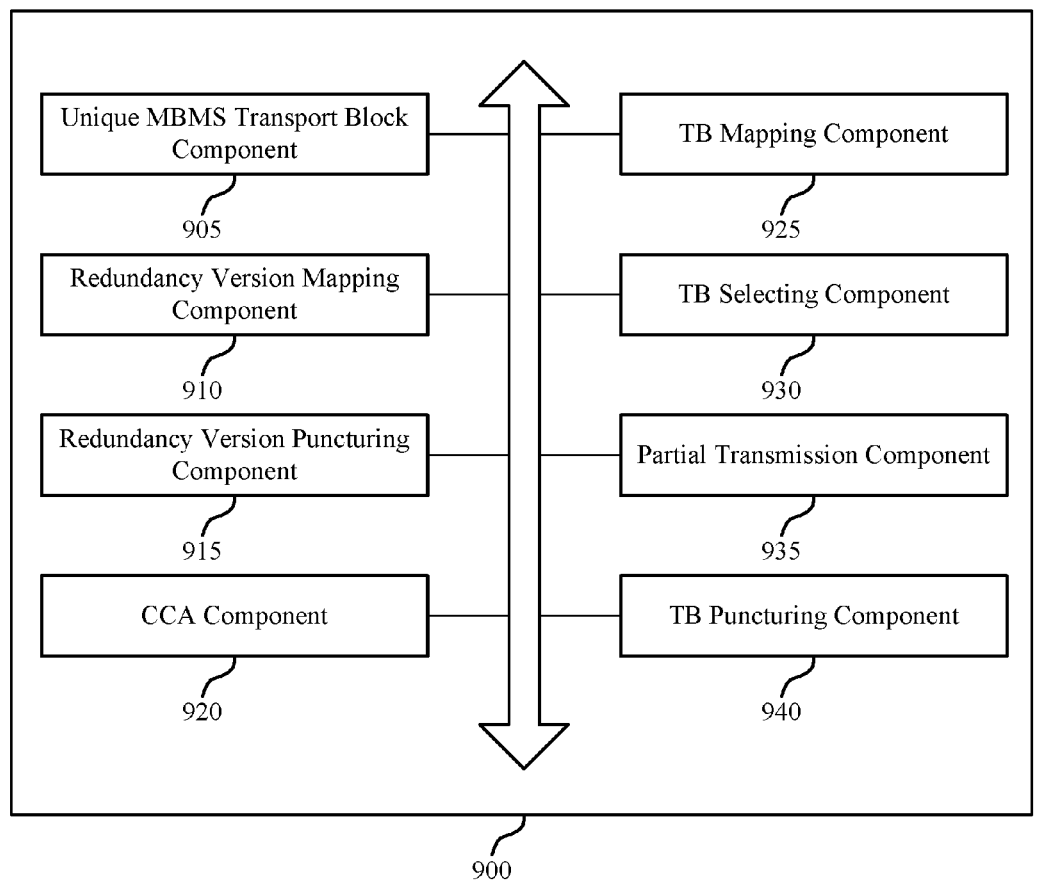
FIG. 9 shows a diagram of an ECC SFN manager that supports eMBMS in eCC over a variable transmission bandwidth, in accordance with aspects of the present disclosure.

FIG. 9 shows a diagram of an eCC SFN manager 900 that supports eMBMS in eCC over a variable transmission bandwidth, in accordance with aspects of the present disclosure. The eCC SFN manager 900 may be an example of the corresponding component of wireless device 700 or wireless device 800. That is, eCC SFN manager 900 may be an example of aspects of eCC SFN manager 710 or eCC SFN manager 810 described with reference to FIGS. 7 and 8. The eCC SFN manager 900 may also be an example of aspects of the eCC SFN manager 1005 described with reference to FIG. 10. The eCC SFN manager 900 may include a unique MBMS TB component 905, a redundancy version mapping component 910, a redundancy version puncturing component 915, a CCA component 920, a TB mapping component 925, a TB selecting component 930, a partial transmission component 935, and a TB puncturing component 940. Each of these modules may communicate, directly or indirectly, with one another (e.g., via one or more buses).

The unique MBMS TB component 905 may map a unique MBMS TB to each of the plurality of carriers. In some examples the mapping may exclude one or more guard regions, for example the guard region of each of the plurality of carriers. In some cases, the mapping may include mapping the unique MBMS TB to a guard region of the respective carrier.

The redundancy version mapping component 910 may map a redundancy version of the one or more MBMS TBs to each of the plurality of carriers. In some examples the mapping may exclude a guard region of each of the plurality of carriers. In some cases, the mapping may include mapping a redundancy version of the one or more MBMS TBs to a guard region of each of the plurality of carriers.

In some cases, the redundancy version of the one or more MBMS TBs includes a same redundancy version for the plurality of carriers. In some cases, the redundancy version of the one or more MBMS TBs includes a unique redundancy version for the plurality of carriers. In some cases, an MCS, a resource block, a version indicator, a TBS anchor, or any combination thereof for the redundancy version may be indicated in a SIB, a MCCH, or in RRC signaling. In some cases, the redundancy version includes systematic bits and parity bits.

The redundancy version puncturing component 915 may refrain from transmitting an MBMS TB, or portion(s) thereof, in a carrier for which the result of a CCA was an unsuccessful CCA, and may puncture the one or more MBMS TBs, or portion(s) thereof, in a guard region of a carrier associated with a successful CCA that is adjacent to a carrier that is associated with an unsuccessful CCA.

The CCA component 920 may perform a CCA (e.g., in cooperation with a receiver and/or a transmitter) on the plurality of carriers. The TB mapping component 925 may map one or more MBMS TBs to a plurality of carriers. The TB selecting component 930 may select a portion of the one or more MBMS TBs to transmit based at least in part on a result of the CCA for the plurality of carriers. In some examples the selecting may include puncturing an MBMS TB in a guard region of a carrier associated with a successful CCA that is adjacent to a carrier associated with an unsuccessful CCA. The partial transmission component 935 may transmit (e.g., in cooperation with a transmitter) the selected portion of the one or more MBMS TBs according to the mapping over one or more of the plurality of carriers that passed the CCA.

The TB puncturing component 940 may puncture one or more MBMS TBs in a guard region of a carrier associated with a successful CCA that is adjacent to a carrier associated with an unsuccessful CCA, and may refrain from transmitting an MBMS TB mapped to a carrier associated with an unsuccessful CCA.

Figure 10:
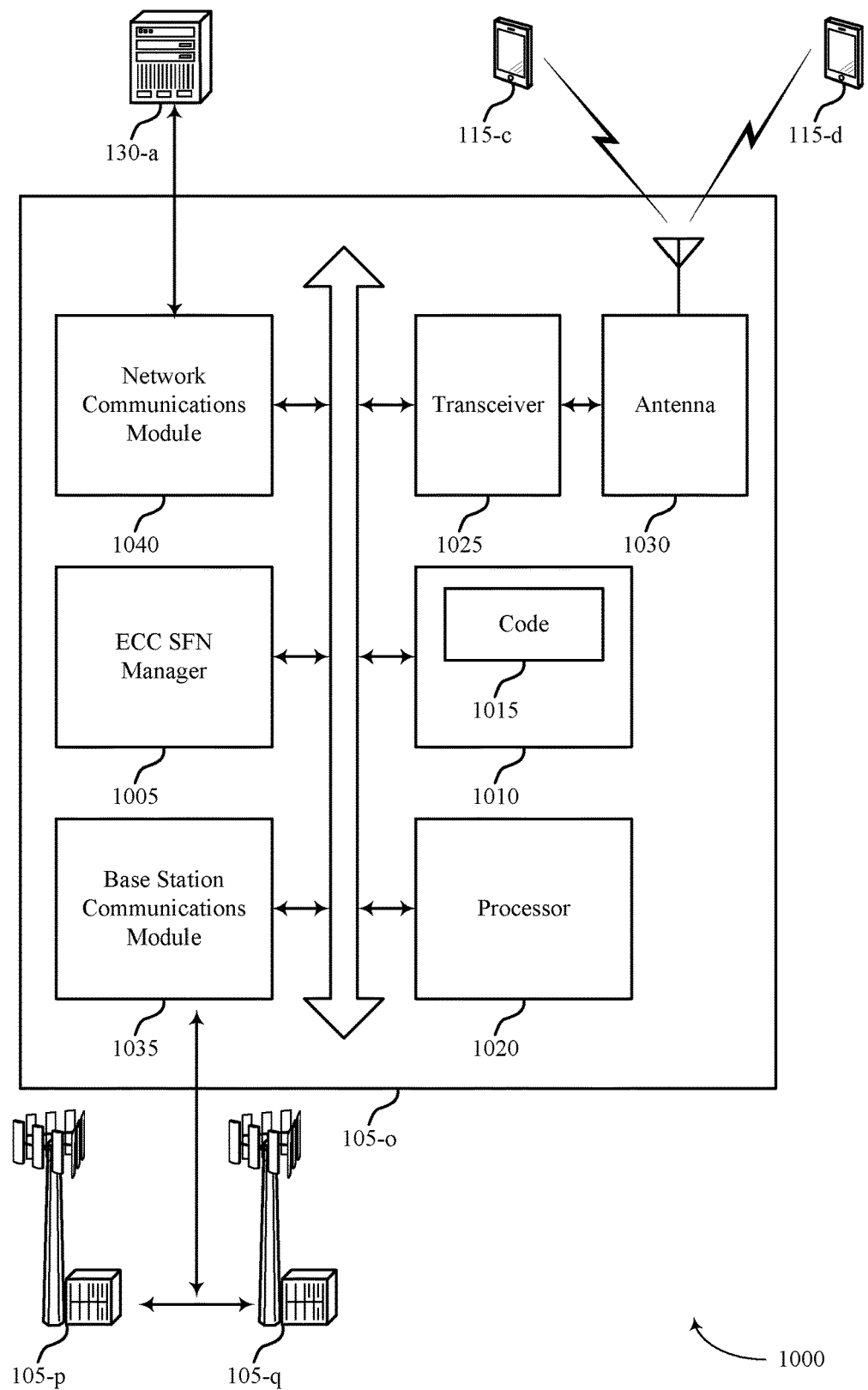
FIG. 10 shows a diagram of a wireless communication system including a base station that supports eMBMS in eCC over a variable transmission bandwidth, in accordance with aspects of the present disclosure.

FIG. 10 shows a diagram of a wireless communication system 1000 including a base station 105-o that supports eMBMS in The eCC over a variable transmission bandwidth, in accordance with aspects of the present disclosure. Base station 105-o may be an example of a wireless device 700, a wireless device 800, or a base station 105 as described with reference to FIGS. 1 through 9. Base station 105-o may include components for bi-directional voice and data communications including components for transmitting communications and components for receiving communications. For example, base station 105-o may communicate bi-directionally with one or more UEs 115 (e.g., UEs 115-c and 115-d).

Base station 105-o may also include an eCC SFN manager 1005, memory 1010, a processor 1020, a transceiver 1025, an antenna 1030, a base station communications module 1035, and a network communications module 1040. Each of these modules may communicate, directly or indirectly, with one another (e.g., via one or more buses). The eCC SFN manager 1005 may be an example of an eCC SFN manager as described with reference to FIGS. 7 through 9.

The memory 1010 may include random access memory (RAM) and/or read only memory (ROM). The memory 1010 may store computer-readable, computer-executable software/firmware code 1015 including instructions that, when executed, cause the processor to perform various functions described herein (e.g., eMBMS in eCC over a variable transmission bandwidth, etc.). In some cases, the code 1015 may not be directly executable by the processor but may cause a computer (e.g., when compiled and executed) to perform functions described herein. The processor 1020 may include an intelligent hardware device, (e.g., a central processing unit (CPU), a microcontroller, an application specific integrated circuit (ASIC), etc.)

The transceiver 1025 may communicate bi-directionally, via one or more antennas, wired, or wireless links, with one or more networks, as described above. For example, the transceiver 1025 may communicate bi-directionally with a base station 105 (e.g., base stations 105-p and 105-q) and/or a UE 115 (e.g., UEs 115-c and 115-d). The transceiver 1025 may also include a modem to modulate the packets and provide the modulated packets to the antennas for transmission, and to demodulate packets received from the antennas.

In some cases, the wireless device may include a single antenna 1030. However, in some cases the device may have more than one antenna 1030, which may be capable of concurrently transmitting or receiving multiple wireless transmissions.

The base station communications module 1035 may manage communications with other base stations 105, and may include a controller or scheduler for controlling communications with UEs 115 in cooperation with other base stations 105. For example, the base station communications module 1035 may coordinate scheduling for transmissions to UEs 115 for various interference mitigation techniques such as beamforming or joint transmission. In some examples, base station communications module 1035 may provide an X2 interface within an LTE/LTE-*a* wireless communication network technology to provide communication between base stations 105.

The network communications module 1040 may manage communications with the core network (e.g., via one or more wired backhaul links). For example, the network communications module 1040 may manage the transfer of data communications for client devices, such as one or more UEs 115.

Figure 11:
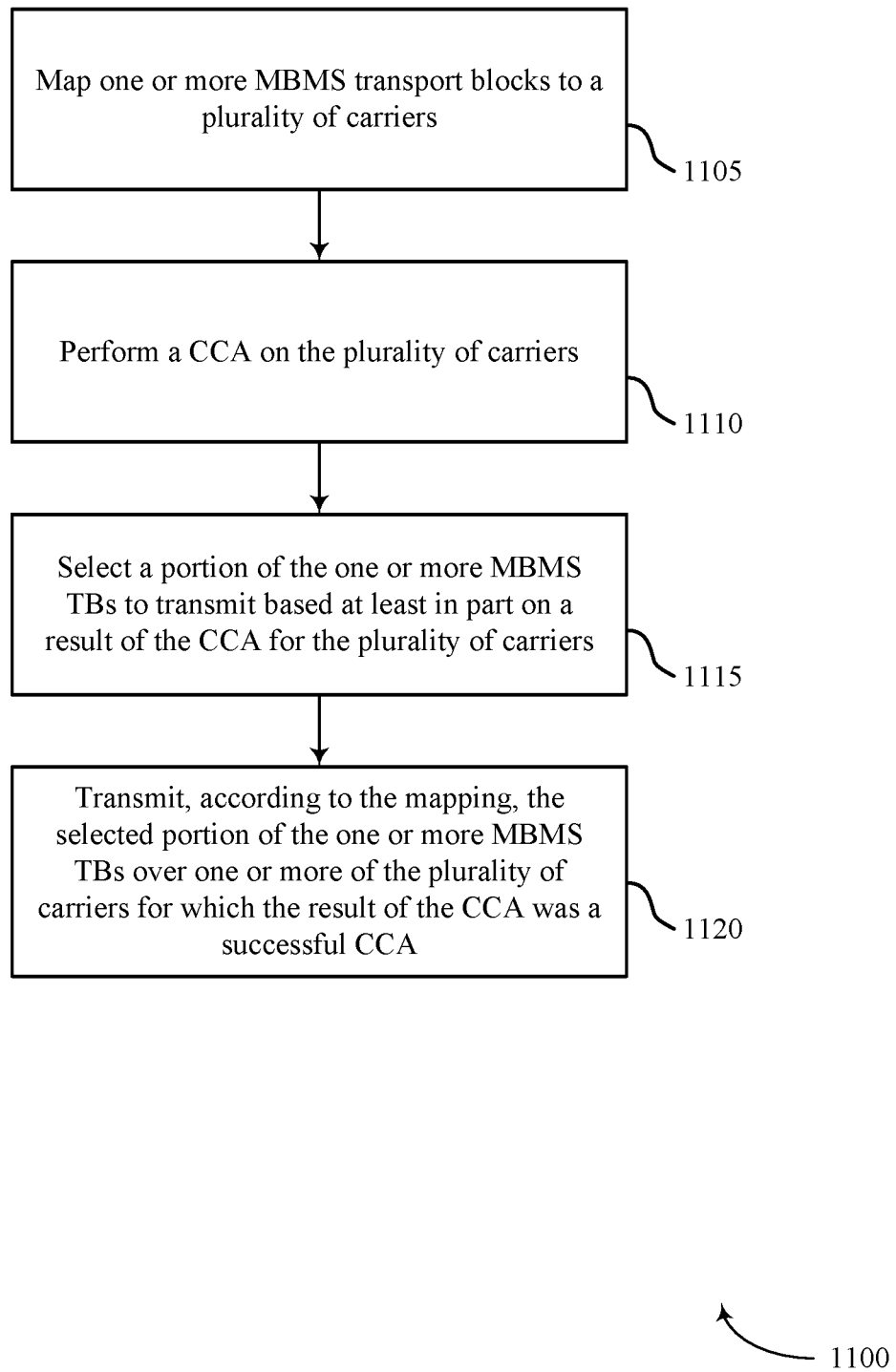
FIGS. 11 through 14 illustrate methods that support eMBMS in eCC over a variable transmission bandwidth, in accordance with aspects of the present disclosure.

FIG. 11 illustrates a method 1100 that supports eMBMS in eCC over a variable transmission bandwidth, in accordance with aspects of the present disclosure. The operations of method 1100 may be implemented by a base station 105 or its components as described with reference to FIGS. 1 and 2. For example, the operations of method 1100 may be performed by an eCC SFN manager as described herein. In some examples, the base station 105 may execute a set of codes to control the functional elements of the device to perform the functions described below. Additionally or alternatively, the base station 105 may perform aspects the functions described below using special-purpose hardware.

At block 1105, the base station 105 may map one or more MBMS TBs to a plurality of carriers, as described with reference to FIGS. 2 through 6. In some examples, the plurality of carriers may be of a shared radio frequency spectrum band, including unlicensed RF spectrum bands, as described above. Operations of block 1105 may be performed by a TB mapping component as described with reference to FIGS. 8 and 9.

At block 1110, the base station 105 may perform a CCA on the plurality of carriers, as described with reference to FIGS. 2 through 6. Operations of block 1110 may be performed by a CCA component as described with reference to FIGS. 8 and 9 (e.g., in cooperation with a receiver and/or transmitter).

At block 1115, the base station 105 may select a portion of the one or more MBMS TBs to transmit based at least in part on a result of the CCA for the plurality of carriers, as described with reference to FIGS. 2 through 6. Operations of block 1115 may be performed by a TB selecting component as described with reference to FIGS. 8 and 9.

At block 1120, the base station 105 may transmit, according to the mapping, the selected portion of the one or more MBMS TBs over one or more of the plurality of carriers for which the result of the CCA was a successful CCA, as described with reference to FIGS. 2 through 6. Operations of block 1120 may be performed by a partial transmission component as described with reference to FIGS. 8 and 9 (e.g., in cooperation with a transmitter).

Figure 12:
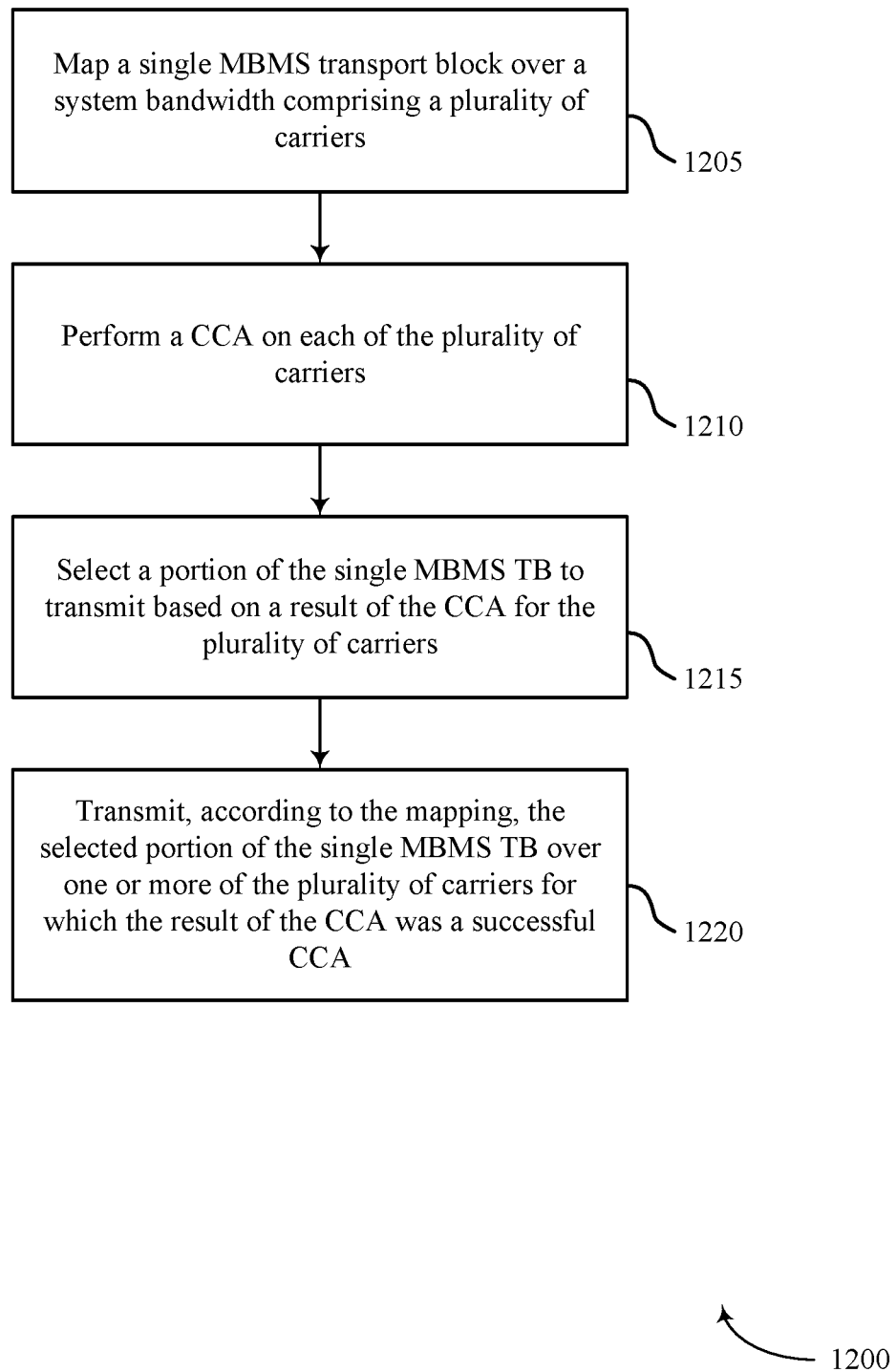

FIG. 12 illustrates a method 1200 that supports eMBMS in eCC over a variable transmission bandwidth, in accordance with aspects of the present disclosure. The operations of method 1200 may be implemented by a base station 105 or its components as described with reference to FIGS. 1 and 2. For example, the operations of method 1200 may be performed by an eCC SFN manager as described herein. In some examples, the base station 105 may execute a set of codes to control the functional elements of the device to perform the functions described below. Additionally or alternatively, the base station 105 may perform aspects the functions described below using special-purpose hardware.

At block 1205, the base station 105 may map a single MBMS TB over a system bandwidth comprising a plurality of carriers, as described with reference to FIGS. 2 through 6. In some examples, the plurality of carriers may be of a shared radio frequency spectrum band, including unlicensed radio frequency spectrum bands, as described above. Operations of block 1205 may be performed by a TB mapping component as described with reference to FIGS. 8 and 9.

At block 1210, the base station 105 may perform a CCA on the plurality of carriers, as described with reference to FIGS. 2 through 6. Operations of block 1210 may be performed by a CCA component as described with reference to FIGS. 8 and 9.

At block 1215, the base station 105 may select a portion of the single MBMS TB to transmit based at least in part on a result of the CCA for the plurality of carriers, as described with reference to FIGS. 2 through 6. Operations of block 1215 may be performed by a TB selecting component as described with reference to FIGS. 8 and 9.

At block 1220, the base station 105 may transmit, according to the mapping, the selected portion of the single MBMS TBs over one or more of the set of carriers for which the result of the CCA was a successful CCA, as described with reference to FIGS. 2 through 6. Operations of block 1220 may be performed by a partial transmission component as described with reference to FIGS. 8 and 9.

Figure 13:
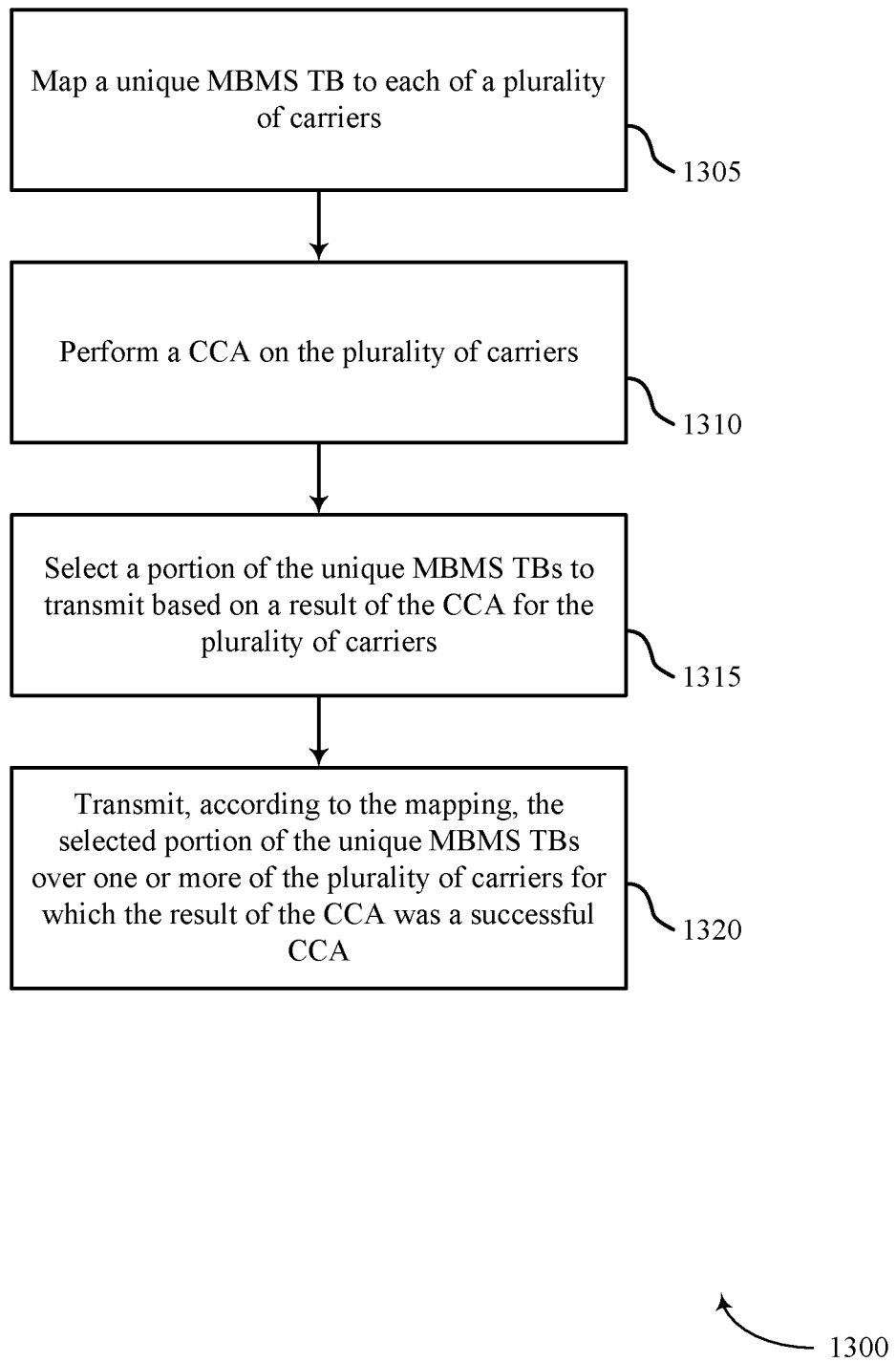

FIG. 13 illustrates a method 1300 that supports eMBMS in eCC over a variable transmission bandwidth, in accordance with aspects of the present disclosure. The operations of method 1300 may be implemented by a base station 105 or its components as described with reference to FIGS. 1 and 2. For example, the operations of method 1300 may be performed by the eCC SFN manager as described herein. In some examples, the base station 105 may execute a set of codes to control the functional elements of the device to perform the functions described below. Additionally or alternatively, the base station 105 may perform aspects the functions described below using special-purpose hardware.

At block 1305, the base station 105 may map a unique MBMS TB to each of a plurality of carriers, as described with reference to FIGS. 2 through 6. In some examples, the plurality of carriers may be of a shared radio frequency spectrum band, including unlicensed RF spectrum bands, as described above. Operations of block 1305 may be performed by a TB mapping component as described with reference to FIGS. 8 and 9.

At block 1310, the base station 105 may perform a CCA on the plurality of carriers, as described with reference to FIGS. 2 through 6. Operations of block 1310 may be performed by a CCA component as described with reference to FIGS. 8 and 9.

At block 1315, the base station 105 may select a portion of the unique MBMS TBs to transmit based at least in part on a result of the CCA for each of the set of carriers, as described with reference to FIGS. 2 through 6. Operations of block 1315 may be performed by a TB selecting component as described with reference to FIGS. 8 and 9.

At block 1320, the base station 105 may transmit, according to the mapping, the selected portion of the unique MBMS TBs over one or more of the set of carriers for which the result of the CCA was a successful CCA, as described with reference to FIGS. 2 through 6. Operations of block 1320 may be performed by a partial transmission component as described with reference to FIGS. 8 and 9.

Figure 14:
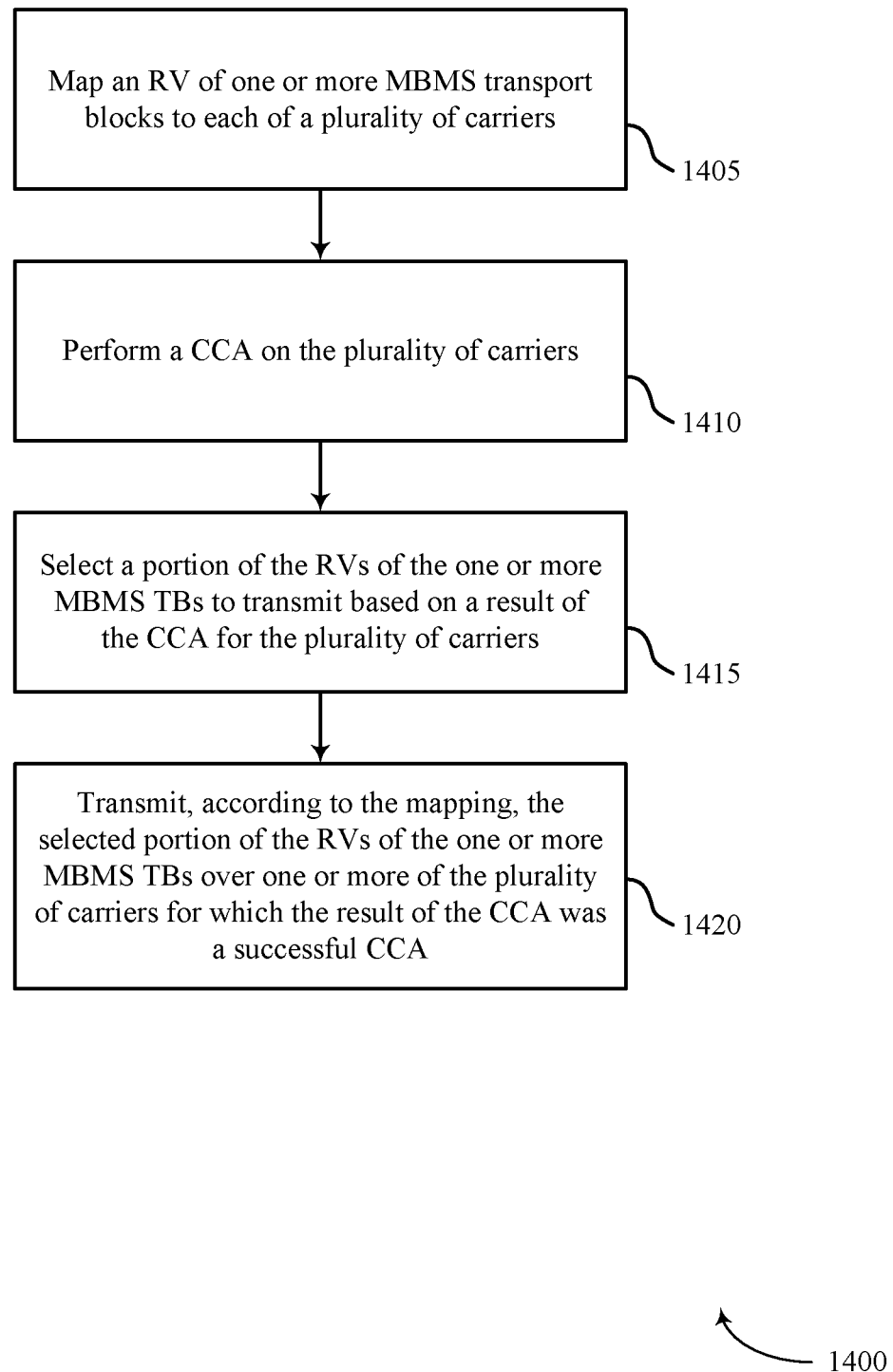

FIG. 14 illustrates a method 1400 that supports eMBMS in eCC over a variable transmission bandwidth, in accordance with aspects of the present disclosure. The operations of method 1400 may be implemented by a base station 105 or its components as described with reference to FIGS. 1 and 2. For example, the operations of method 1400 may be performed by the eCC SFN manager as described herein. In some examples, the base station 105 may execute a set of codes to control the functional elements of the device to perform the functions described below. Additionally or alternatively, the base station 105 may perform aspects the functions described below using special-purpose hardware.

At block 1405, the base station 105 may map a RV of one or more MBMS TBs to each of a plurality of carriers, as described with reference to FIGS. 2 through 6. In some examples, the plurality of carriers may be of a shared radio frequency spectrum band, including unlicensed RF spectrum bands, as described above. Operations of block 1405 may be performed by a TB mapping component as described with reference to FIGS. 8 and 9.

At block 1410, the base station 105 may perform a CCA on the plurality of carriers, as described with reference to FIGS. 2 through 6. Operations of block 1410 may be performed by a CCA component as described with reference to FIGS. 8 and 9.

At block 1415, the base station 105 may select a portion of the RVs of the one or more MBMS TBs to transmit based at least in part on a result of the CCA for the plurality of carriers, as described with reference to FIGS. 2 through 6. Operations of block 1415 may be performed by a TB selecting component as described with reference to FIGS. 8 and 9.

At block 1420, the base station 105 may transmit, according to the mapping, the selected portion of the RVs over one or more of the set of carriers for which the result of the CCA was a successful CCA, as described with reference to FIGS. 2 through 6. Operations of block 1420 may be performed by a partial transmission component as described with reference to FIGS. 8 and 9.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for eMBMS in eCC over a variable transmission bandwidth.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-a are releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, shared, unlicensed, etc.) radio frequency spectrum bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink (DL) transmissions described herein may also be called forward link transmissions while the uplink (UL) transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for eMBMS in eCC over a variable transmission bandwidth. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a DSP, an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
   mapping one or more multicast broadcast multi-media service (MBMS) transport blocks to a plurality of carriers over a system bandwidth comprising the plurality of carriers, wherein the one or more MBMS transport blocks comprise a single MBMS transport block for the system bandwidth;
   performing a clear channel assessment (CCA) on each carrier of the plurality of carriers;
   selecting a portion of the one or more MBMS transport blocks to transmit based at least in part on a result of the CCA for the plurality of carriers;
   puncturing the single MBMS transport block in a guard region of a first carrier for which the result of the CCA was a successful CCA and a second carrier for which the result of the CCA was a failed CCA, wherein the first carrier is adjacent to the second carrier; and
   transmitting, according to the mapping, the selected portion of the one or more MBMS transport blocks over one or more of the plurality of carriers for which the result of the CCA was a successful CCA.

2. The method of claim 1, wherein the mapping the one or more MBMS transport blocks to the plurality of carriers comprises:
   mapping a unique MBMS transport block to the plurality of carriers.

3. The method of claim 2, further comprising:
   refraining from transmitting the unique MBMS transport block mapped to a carrier for which the result of the CCA was a failed CCA.

4. The method of claim 2, wherein mapping the unique MBMS transport block to the plurality of carriers comprises:
   excluding a guard region of the plurality of carriers.

5. The method of claim 2, wherein:
   mapping the unique MBMS transport block to the plurality of carriers comprises mapping the unique MBMS transport block to a guard region of the plurality of carriers; and
   the method further comprises puncturing the unique MBMS transport block in the guard region of a first carrier for which the result of the CCA was a successful CCA, the first carrier being adjacent to a second carrier for which the result of the CCA was a failed CCA.

6. The method of claim 1, wherein mapping the one or more MBMS transport blocks to the plurality of carriers comprises:
   mapping a redundancy version of the one or more MBMS transport blocks to the plurality of carriers.

7. The method of claim 6, further comprising:
   refraining from transmitting the redundancy version of an MBMS transport blocks mapped to a carrier for which the result of the CCA was a failed CCA.

8. The method of claim 6, wherein mapping the redundancy version of the one or more MBMS transport blocks to the plurality of carriers comprises:
   excluding a guard region of the plurality of carriers.

9. The method of claim 6, wherein mapping the redundancy version of the one or more MBMS transport blocks to the plurality of carriers comprises:
   mapping the redundancy version of the one or more MBMS transport blocks to a guard region of the plurality of carriers; and
   the method further comprising:
      puncturing the redundancy version of the one or more MBMS transport blocks in the guard region of a first carrier for which the result of the CCA was a successful CCA, the first carrier being adjacent to a second carrier for which the result of the CCA was a failed CCA.

10. The method of claim 6, wherein the redundancy version of the one or more MBMS transport blocks associated with the plurality of carriers comprises a same redundancy version for the plurality of carriers, or a unique redundancy version for the plurality of carriers.

11. The method of claim 6, wherein a modulation and coding scheme (MCS), a resource block, a version indicator, a transport block size (TBS) anchor, or a combination thereof for the redundancy version of the one or more MBMS transport blocks associated with the plurality of carriers is indicated in a system information block (SIB), a multicast control channel (MCCH), radio resource control (RRC) signaling, or a combination thereof.

12. The method of claim 6, wherein the redundancy version of the one or more MBMS transport blocks associated with the plurality of carriers comprises systematic bits and parity bits.

13. An apparatus for wireless communication, comprising:
   a processor;
   memory in electronic communication with the processor; and
   instructions stored in the memory and operable, when executed by the processor, to cause the apparatus to:
      map one or more multicast broadcast multi-media service (MBMS) transport blocks to a plurality of carriers over a system bandwidth comprising the plurality of carriers, wherein the one or more MBMS transport blocks comprise a single MBMS transport block for the system bandwidth;
      perform a clear channel assessment (CCA) on each carrier of the plurality of carriers;
      select a portion of the one or more MBMS transport blocks to transmit based at least in part on a result of the CCA for the plurality of carriers;
      puncture the single MBMS transport block in a guard region of a first carrier for which the result of the CCA was a successful CCA and a second carrier for which the result of the CCA was a failed CCA, wherein the first carrier is adjacent to the second carrier; and
      transmit, according to the mapping, the selected portion of the one or more MBMS transport blocks over one or more of the plurality of carriers for which the result of the CCA was a successful CCA.

14. The apparatus of claim 13, wherein the instructions operable to cause the apparatus to map one or more MBMS transport blocks comprise instructions operable to cause the apparatus to:
   map a unique MBMS transport block to the plurality of carriers.

15. The apparatus of claim 14, wherein the instructions operable to cause the apparatus to map a unique MBMS to the plurality of carriers comprise instructions operable to cause the apparatus to:

exclude a guard region of the plurality of carriers.

16. The apparatus of claim 14, wherein:

the instructions operable to cause the apparatus to map a unique MBMS to the plurality of carriers comprise instructions operable to cause the apparatus to map the unique MBMS transport block to a guard region of the plurality of carriers; and the instructions are further operable to cause the apparatus to puncture the unique MBMS transport block in the guard region of a first carrier for which the result of the CCA was a successful CCA, the first carrier being adjacent to a second carrier for which the result of the CCA was a failed CCA.

17. The apparatus of claim 13, wherein the instructions to map one or more MBMS transport blocks comprises instructions operable to cause the apparatus to:

map a redundancy version of the one or more MBMS transport blocks to the plurality of carriers.

18. The apparatus of claim 17, wherein the instructions to map the redundancy version of the one or more MBMS transport blocks to the plurality of carriers comprises instructions operable to cause the apparatus to:

exclude a guard region of the plurality of carriers.

19. The apparatus of claim 17, wherein:

the instructions to map the redundancy version of the one or more MBMS transport blocks to the plurality of carriers comprises instructions operable to cause the apparatus to map the redundancy version of the one or more MBMS transport blocks to a guard region of the plurality of carriers; and the instructions are further operable to cause the apparatus to puncture the redundancy version of the one or more MBMS transport blocks in the guard region of a first carrier for which the result of the CCA was a successful CCA, the first carrier being adjacent to a second carrier for which the result of the CCA was a failed CCA.

20. The apparatus of claim 17, wherein the redundancy version of the one or more MBMS transport blocks associated with the plurality of carriers comprises a same redundancy version for the plurality of carriers, or a unique redundancy version for the plurality of carriers.

21. An apparatus for wireless communication comprising:

means for mapping one or more multicast broadcast multi-media service (MBMS) transport blocks to a plurality of carriers over a system bandwidth comprising the plurality of carriers, wherein the one or more MBMS transport blocks comprise a single MBMS transport block for the system bandwidth;

means for performing a clear channel assessment (CCA) on each carrier of the plurality of carriers;

means for selecting a portion of the one or more MBMS transport blocks to transmit based at least in part on a result of the CCA for the plurality of carriers;

means for puncturing the single MBMS transport block in a guard region of a first carrier for which the result of the CCA was a successful CCA and a second carrier for which the result of the CCA was a failed CCA, wherein the first carrier is adjacent to the second carrier;

means for transmitting the selected portion of the one or more MBMS transport blocks according to the mapping over one or more of the plurality of carriers for which the result of the CCA was a successful CCA.

22. The apparatus of claim 21, wherein the means for mapping comprises:

means for mapping a unique MBMS transport block to the plurality of carriers.

23. The apparatus of claim 21, wherein the means for mapping comprises:

means for mapping a redundancy version of the one or more MBMS transport blocks to the plurality of carriers.

24. A non-transitory computer-readable medium storing code for wireless communication, the code comprising instructions executable to:

map one or more multicast broadcast multi-media service (MBMS) transport blocks to a plurality of carriers over a system bandwidth comprising the plurality of carriers, wherein the one or more MBMS transport blocks comprise a single MBMS transport block for the system bandwidth;

perform a clear channel assessment (CCA) on each carrier of the plurality of carriers;

select a portion of the one or more MBMS transport blocks to transmit based at least in part on a result of the CCA for the plurality of carriers;

puncture the single MBMS transport block in a guard region of a first carrier for which the result of the CCA was a successful CCA and a second carrier for which the result of the CCA was a failed CCA, wherein the first carrier is adjacent to the second carrier; and transmit the selected portion of the one or more MBMS transport blocks according to the mapping over one or more of the plurality of carriers for which the result of the CCA was a successful CCA.

* * * * *